INVENTORS.
WILLIAM F. BARTLETT
JAMES D. ROSS
BY Robert L. Nathans
ATTORNEY

SUBSCRIBER SUBSET

Nov. 27, 1962 W. F. BARTLETT ETAL 3,066,192

TIME DIVISION MULTIPLEX TELEPHONE SWITCHING SYSTEM HAVING SINGLE AND MULTIPLE PARTY PRE-ADDRESS AND PRIORITY CHECK CIRCUITRY

Filed May 9, 1960 20 Sheets-Sheet 4

SUBSCRIBER SUBSET

LINE CIRCUIT

LINE TIME SLOT STORE

CALLING LINE SCANNER

TIME SLOT ALLOTTER

Nov. 27, 1962 W. F. BARTLETT ETAL 3,066,192
TIME DIVISION MULTIPLEX TELEPHONE SWITCHING SYSTEM HAVING SINGLE AND MULTIPLE PARTY PRE-ADDRESS AND PRIORITY CHECK CIRCUITRY
Filed May 9, 1960 20 Sheets-Sheet 10
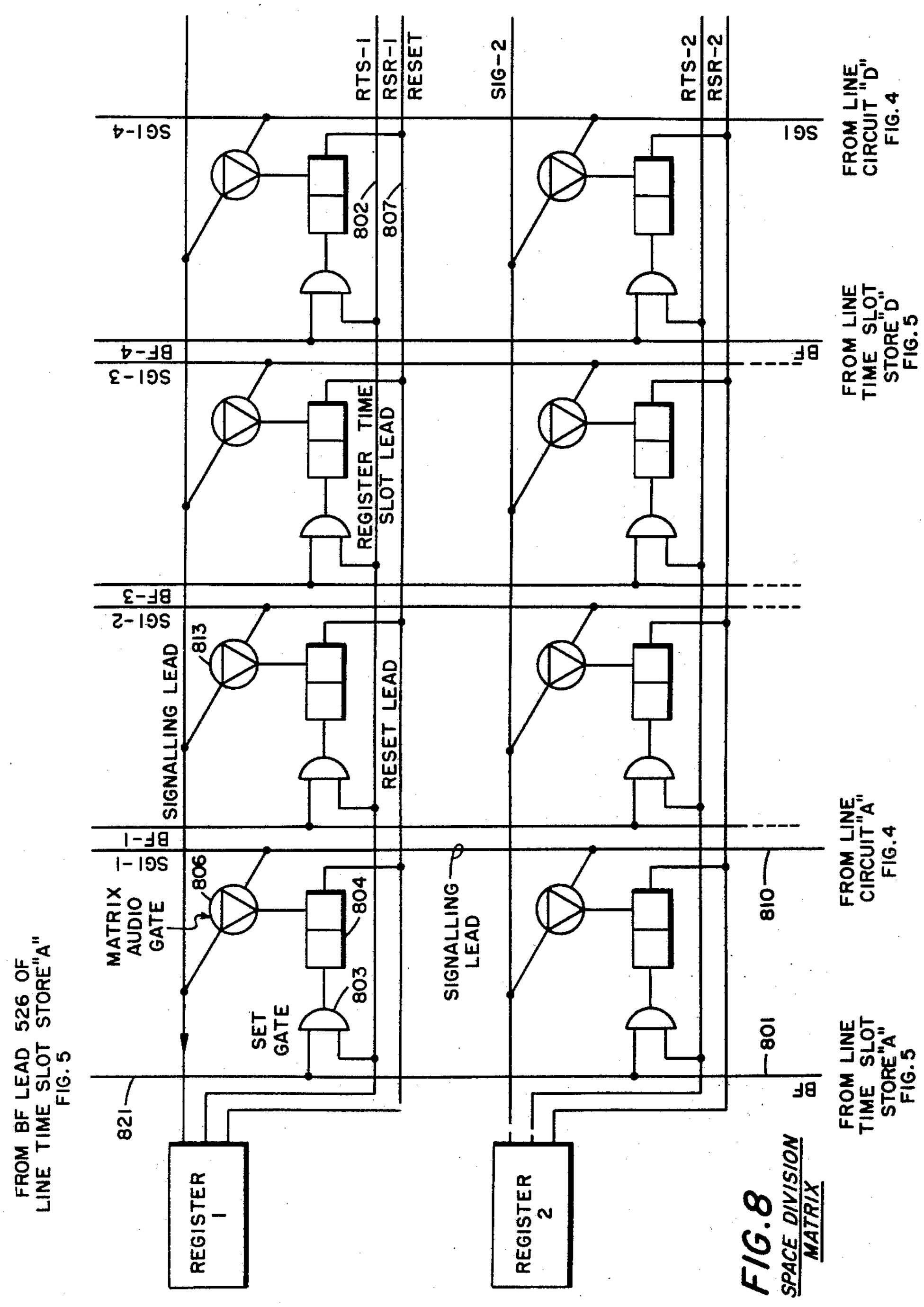
FIG. 8 SPACE DIVISION MATRIX

REGISTER

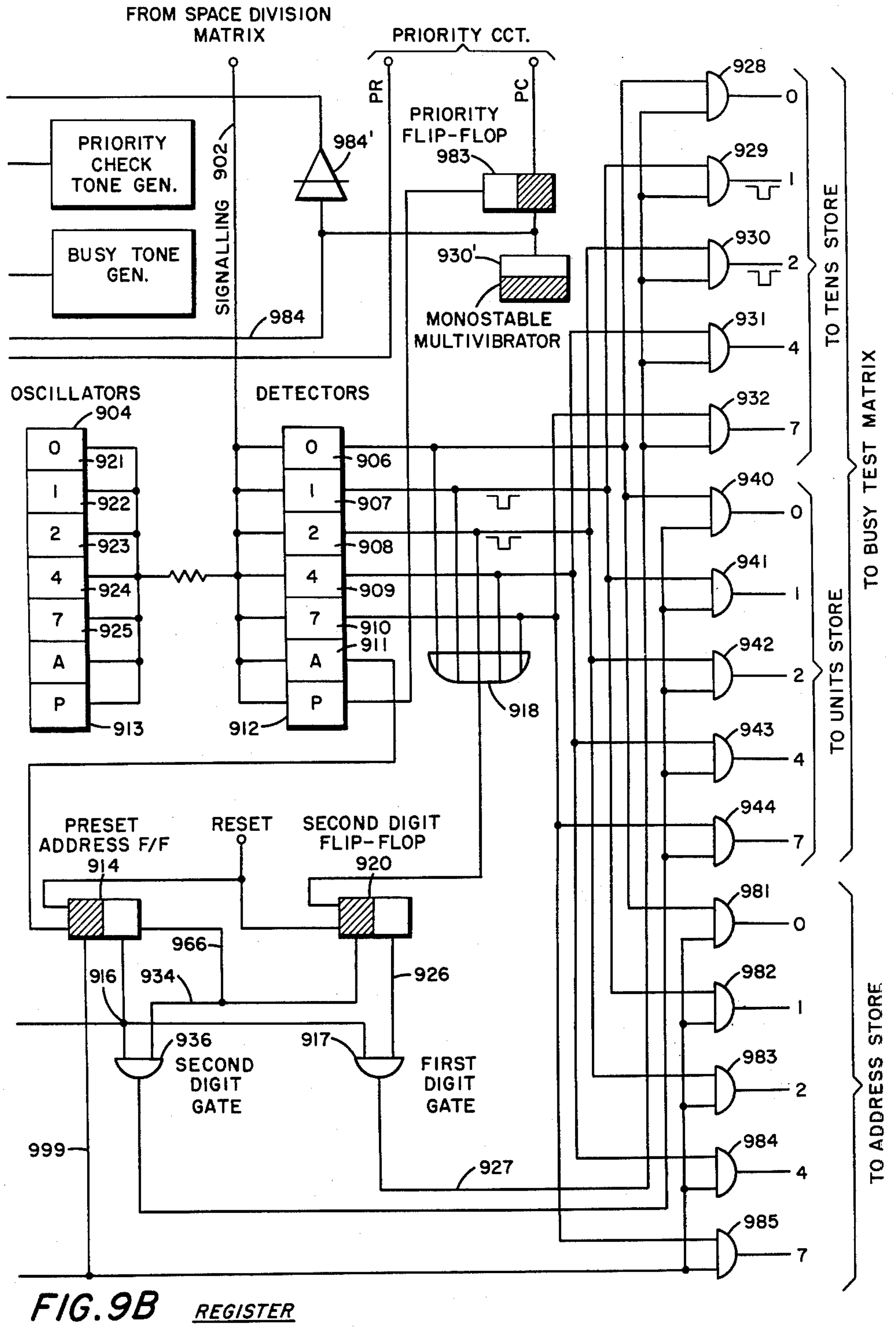
FIG. 9B REGISTER

LINE BUSY TEST MATRIX

LINE BUSY TEST MATRIX

REGISTER ALLOTTER

REGISTER ALLOTTER

STORED ADDRESS CIRCUIT

STORED ADDRESS CIRCUIT

PRIORITY CHECK CIRCUIT

PRIORITY CHECK CIRCUIT 3,066,192

TIME DIVISION MULTIPLEX TELEPHONE SWITCHING SYSTEM HAVING SINGLE AND MULTIPLE PARTY PRE-ADDRESS AND PRIORITY CHECK CIRCUITRY

William F. Bartlett and James D. Ross, Rochester, N.Y., assignors to General Dynamics Corporation, Rochester, N.Y., a corporation of Delaware Filed May 9, 1960, Ser. No. 27,888
9 Claims. (Cl. 179—18)

The present invention relates to telephone switching systems.

In recent years, increased emphasis has been placed on the speed of operation of telephone switching systems. This is especially true in the military field. Where a particular combination of digits are transmitted fairly often in order to complete a connection between a calling and called party, it is desirable that the actuation of a single key should operate circuitry which completes the connection between a calling party and one or more called parties. It is also desirable to provide circuitry for permitting a calling party having a relatively high priority to break into a telephone conversation where the parties conducting this conversation both have a lower priority than the calling party. This is especially important in the military field where time may be of vital importance, although the arrangement is also well adapted for use in industry.

Accordingly, it is a principal object of the present invention to provide an improved telephone switching system.

It is a further object of the present invention to provide a telephone switching system having single party pre-address circuitry whereby the actuation of a single pre-address key by a calling party transmits enough information to complete a telephone connection between the calling party and a called party.

It is a further object of the present invention to provide a telephone switching system having multiple party pre-address circuitry whereby the actuation of a single pre-address key transmits enough information to complete a telephone connection between a calling party and a plurality of called parties.

It is a further object of the present invention to provide an improved telephone switching system whereby a calling party may break into an existing call between the called party and a third party by the transmission of a priority check signal, provided that the calling party has a higher priority rating than both the called party and the third party.

It is yet a further object of the present invention to provide an improved time division multiplex telephone switching system whereby time slots are randomly allotted to a particular call.

It is a further object of the present invention to provide an improved telephone switching system whereby a calling party may break into an existing call between the called party and a third party by the actuation of either a single party pre-address key or a multiple party pre-address key.

It is yet a further object of the present invention to provide an improved time division multiplex telephone switching system whereby the control circuitry has been reduced to a minimum.

Figure 1A:
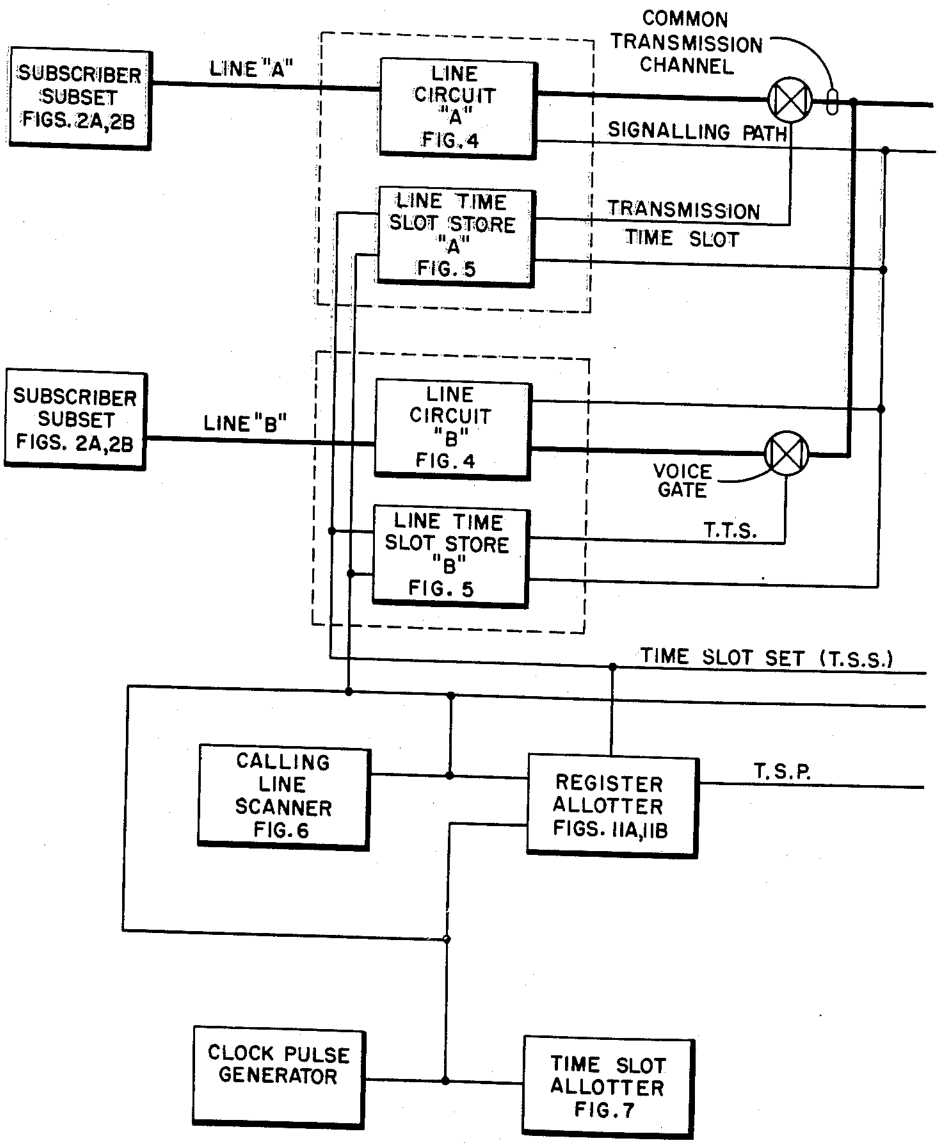
Figure 1B:
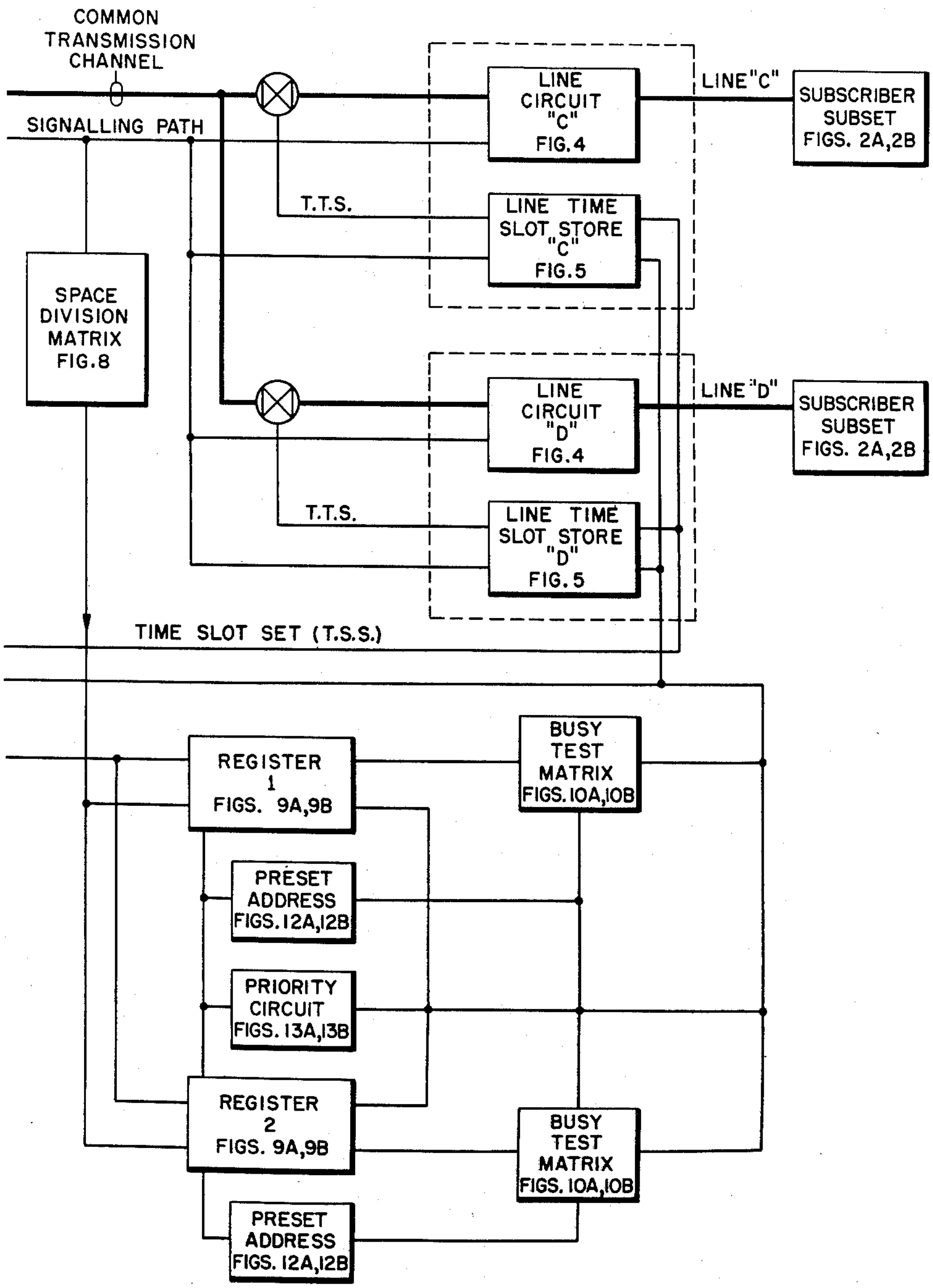
Figure 2A:
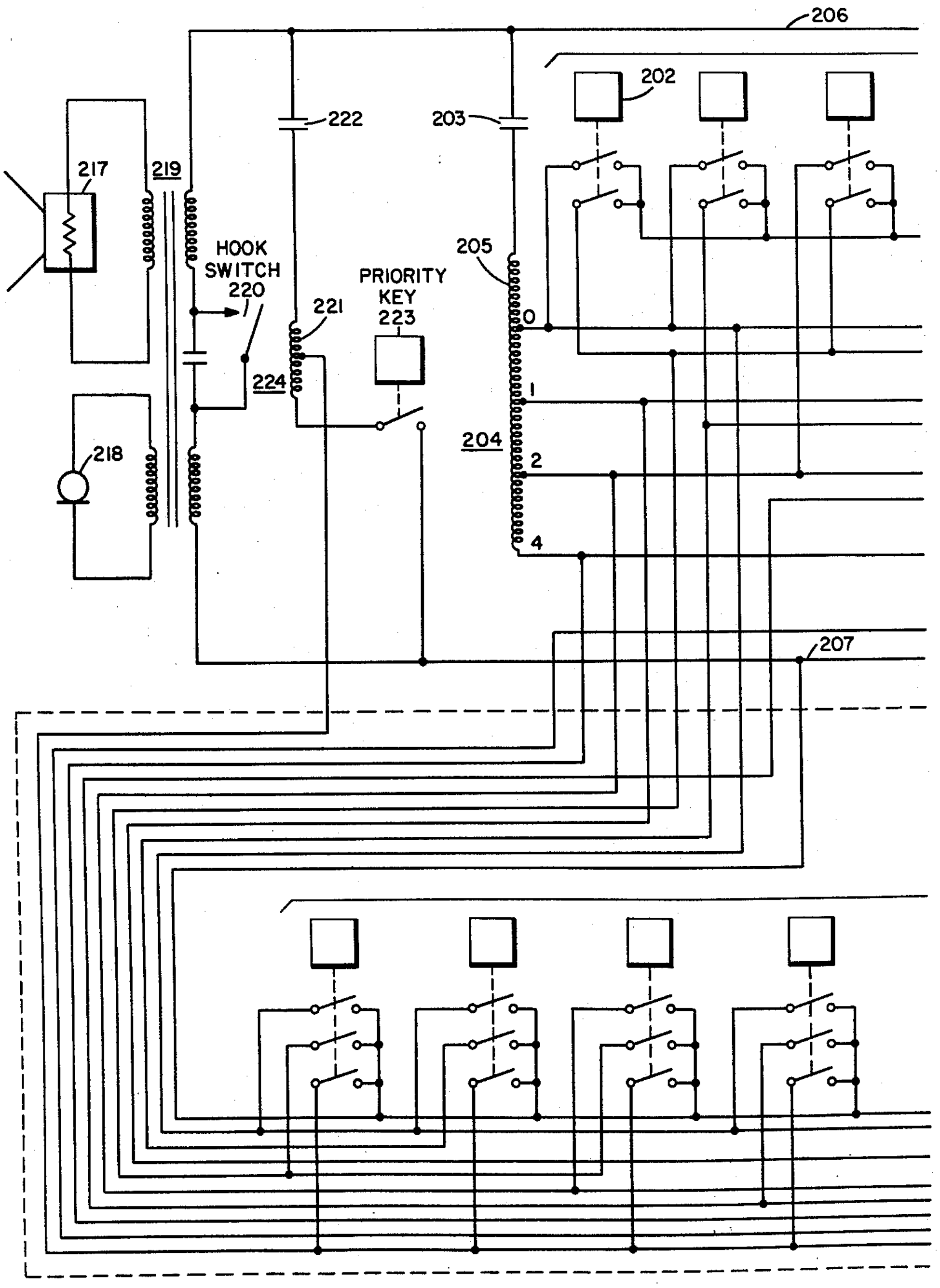
Figure 2B:
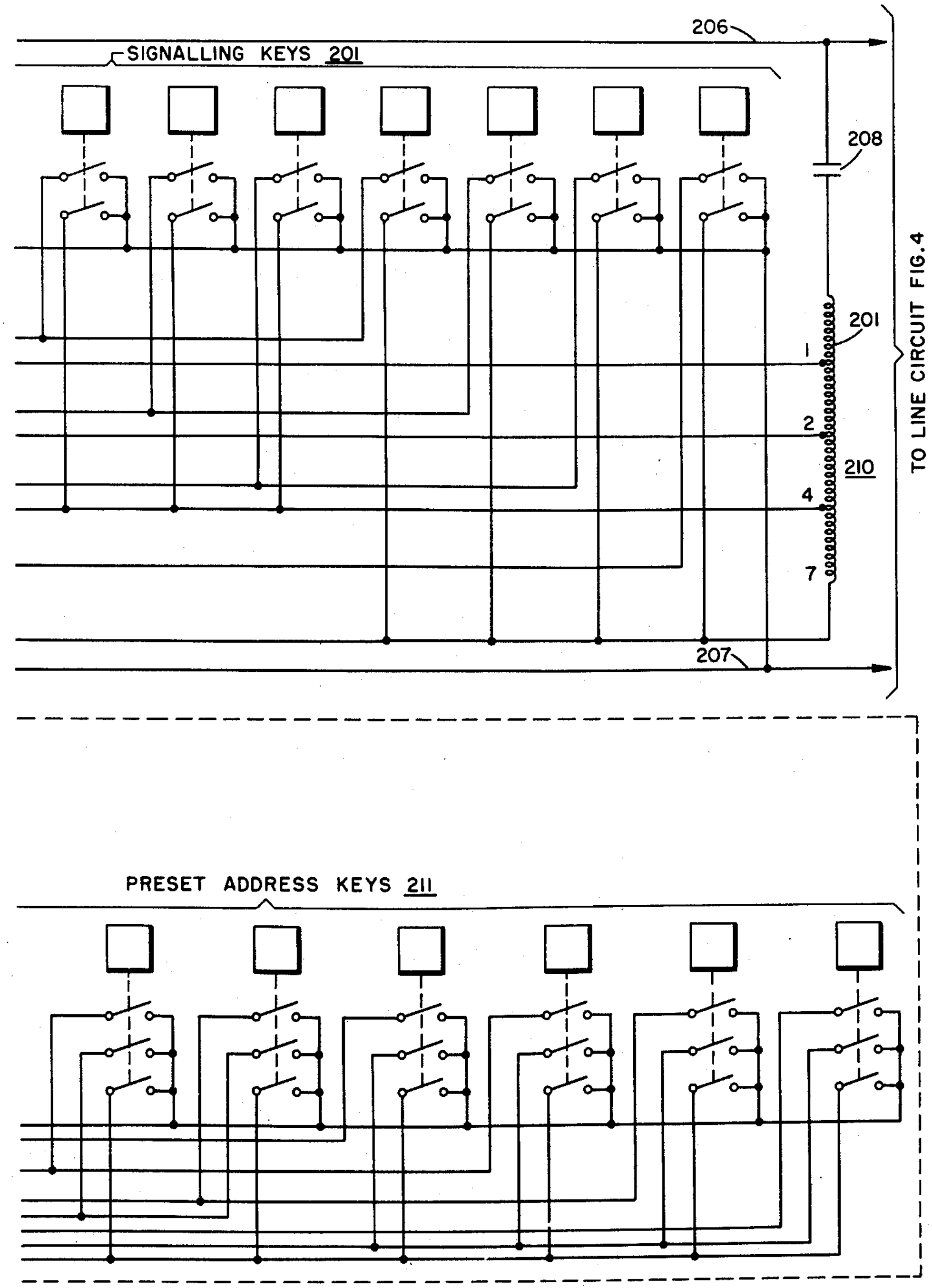
Figure 3:
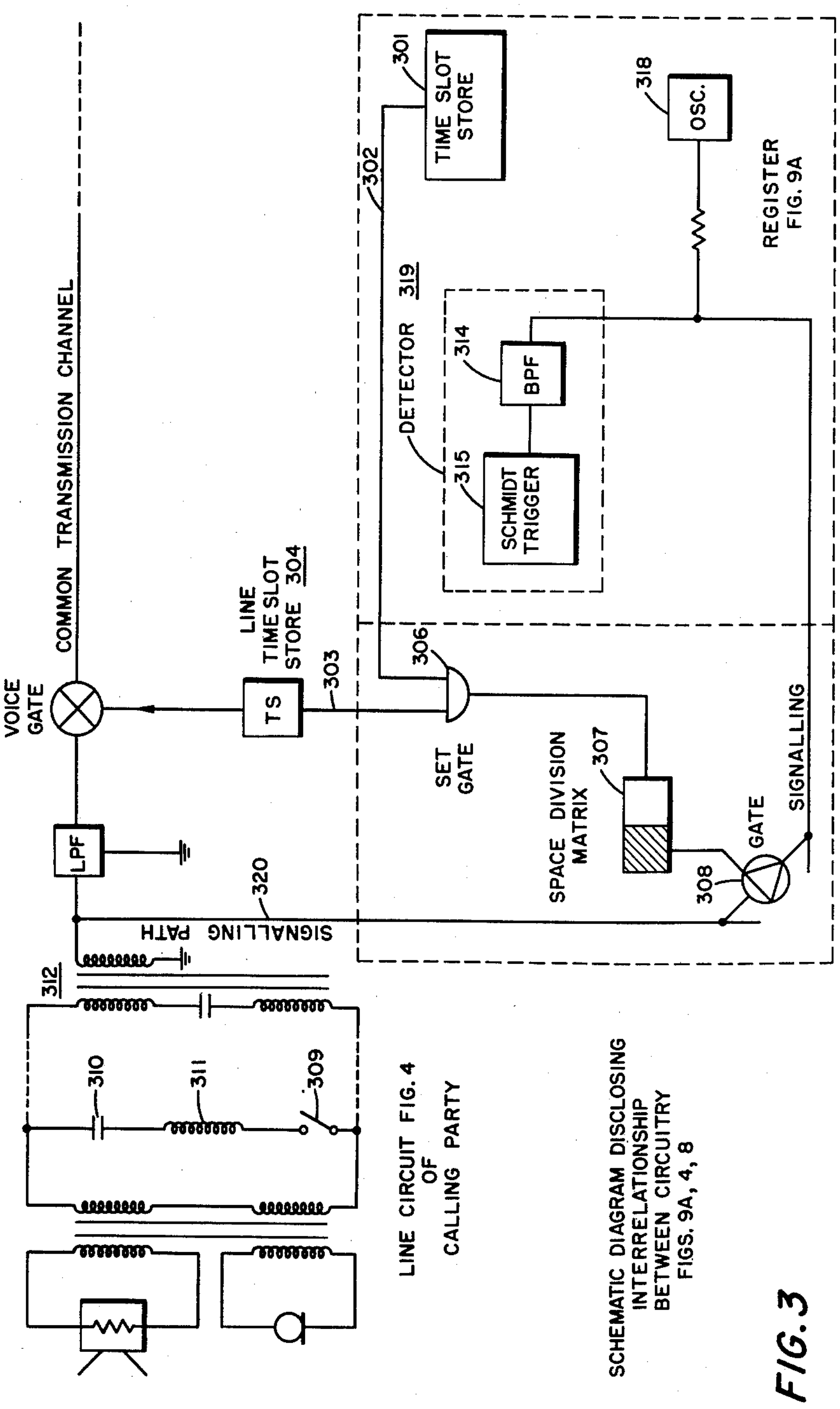
Figure 4:
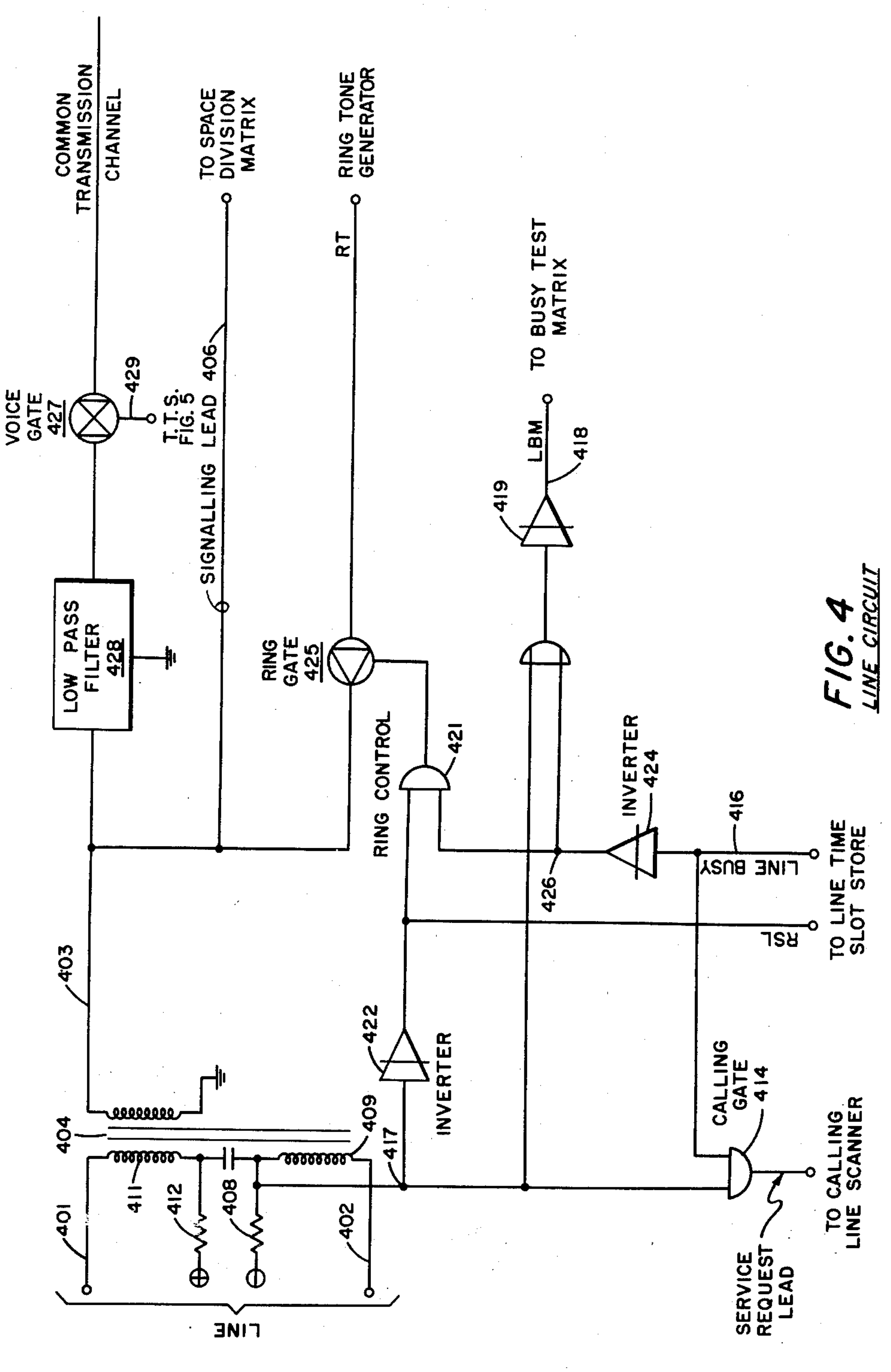
Figure 5:
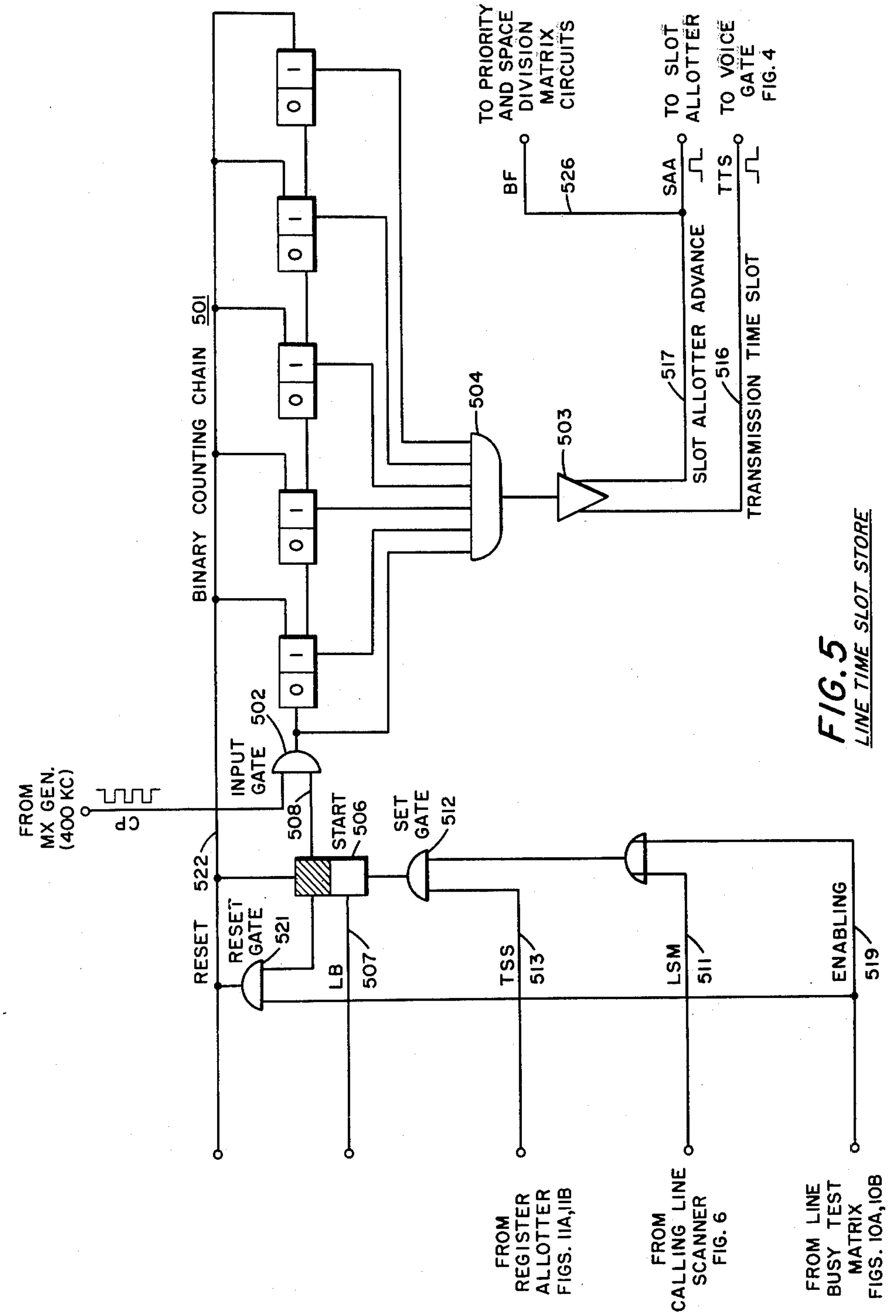
Figure 6:
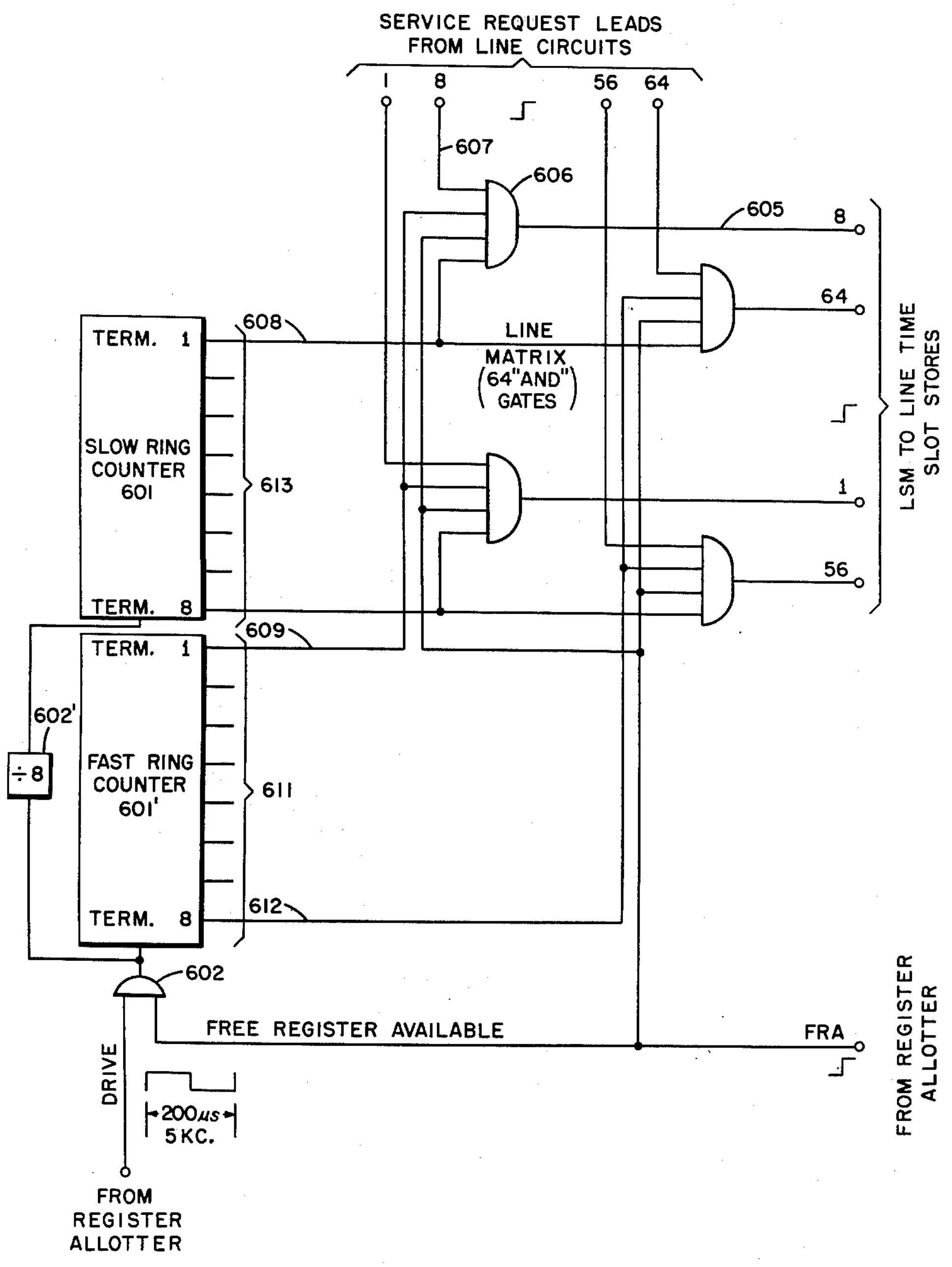
Figure 7:
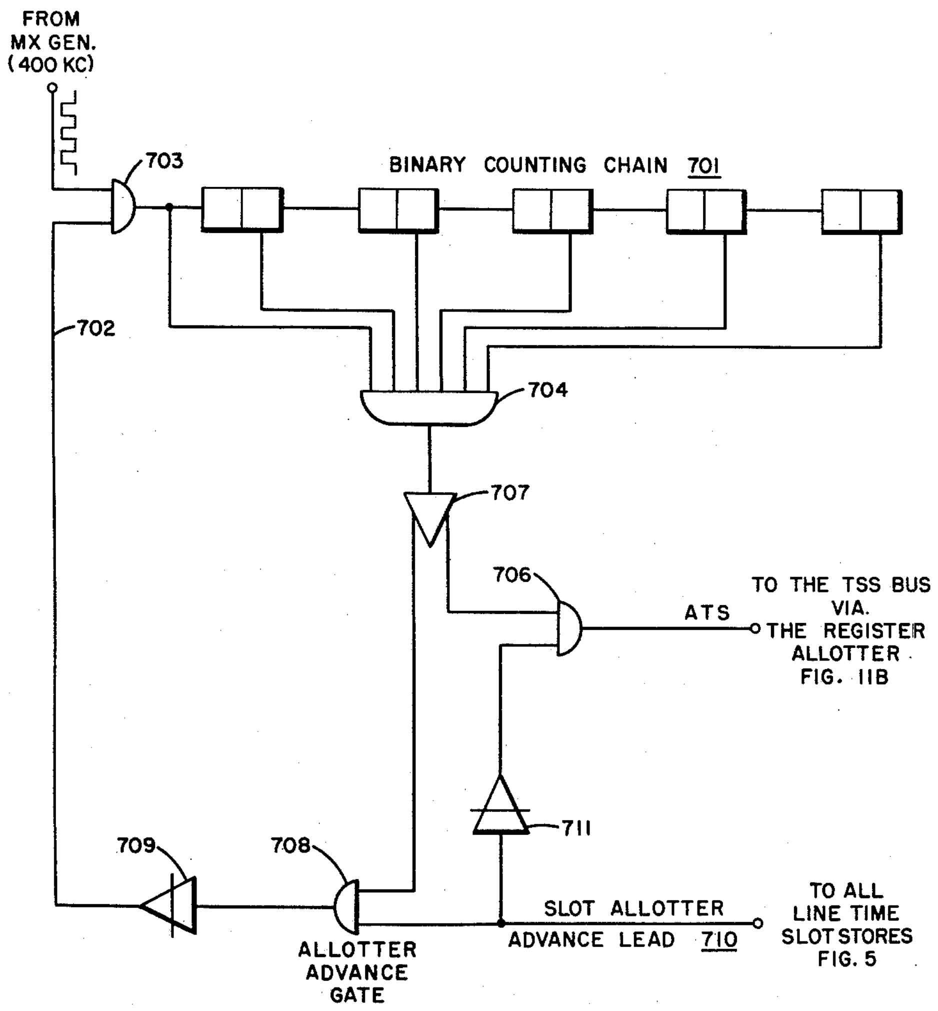
Figure 9A:
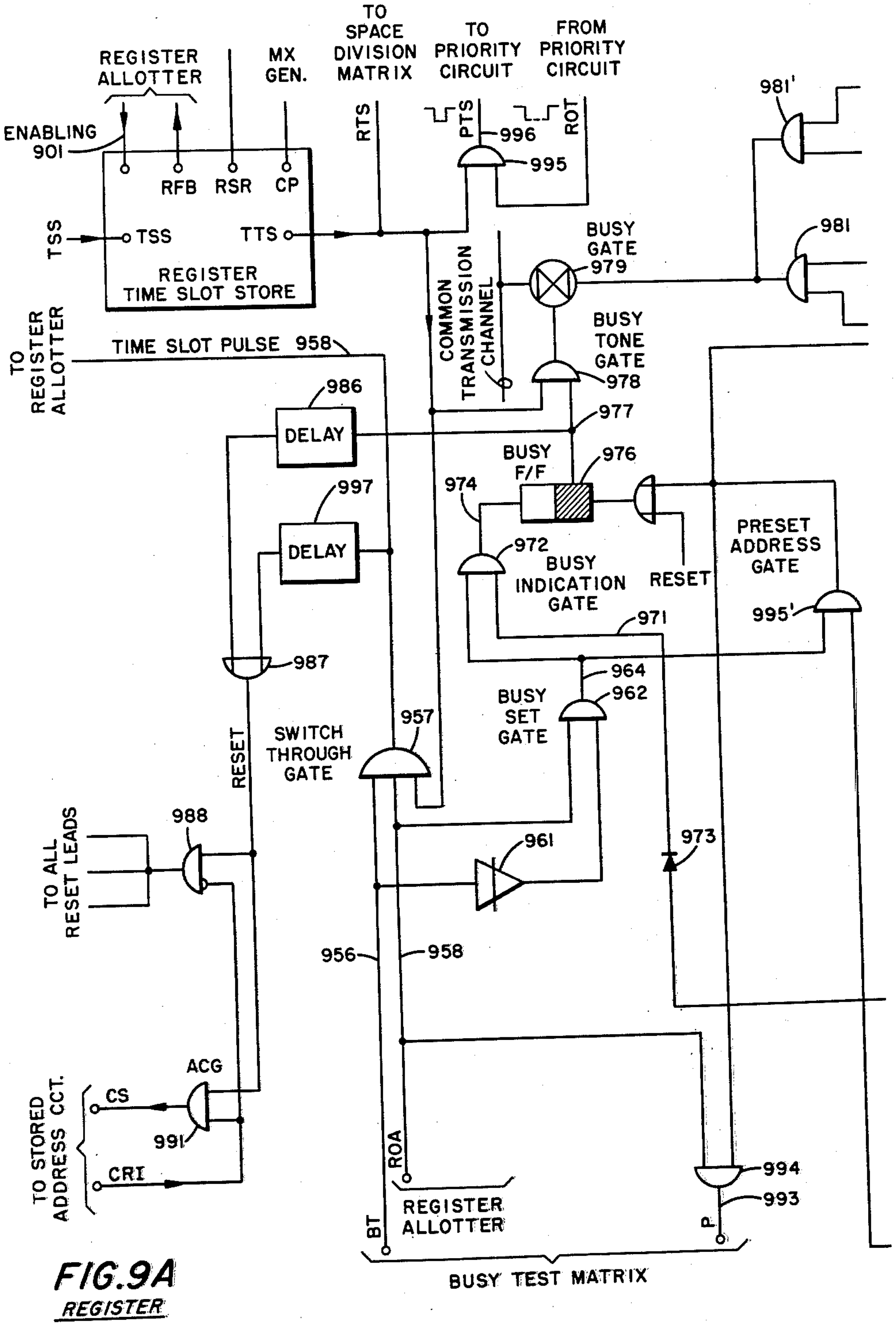
Figure 10A:
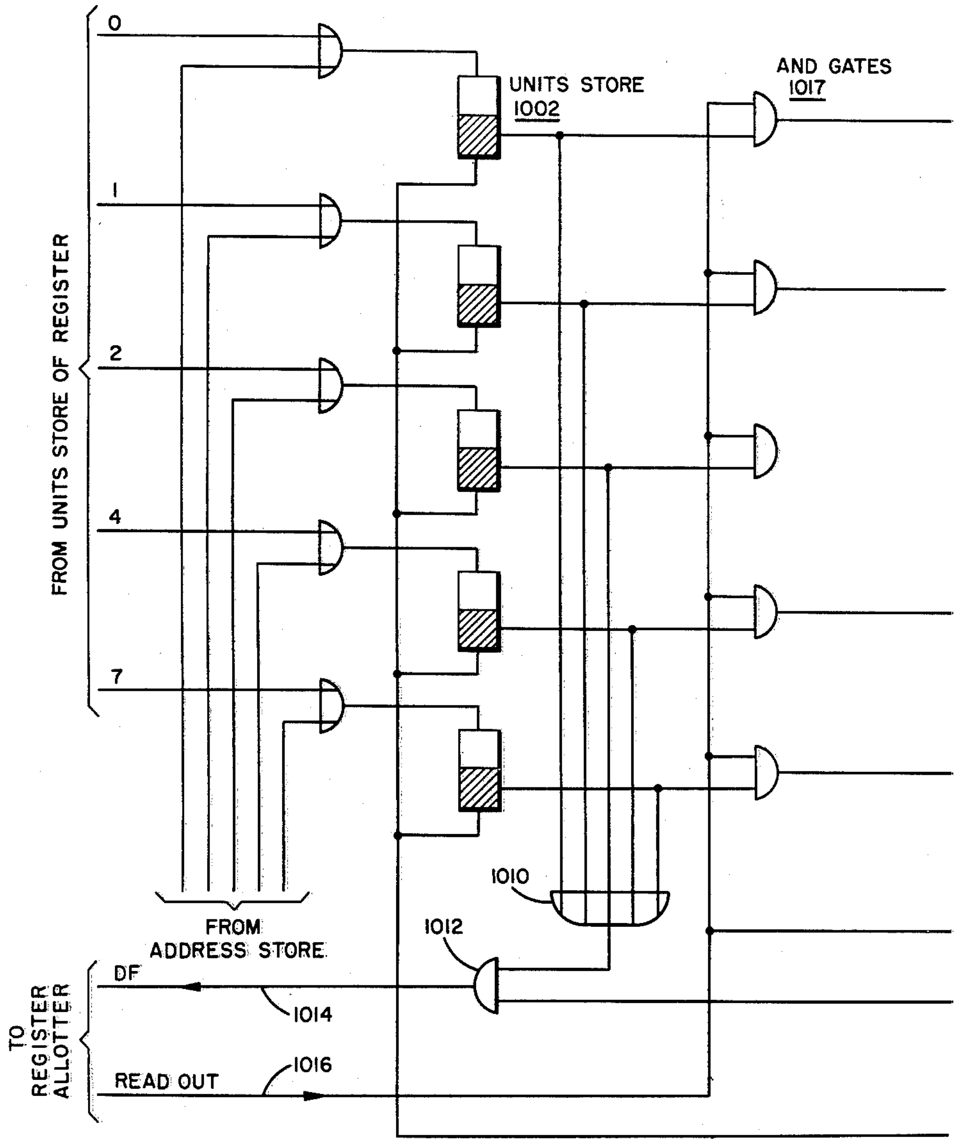
Figure 10B:
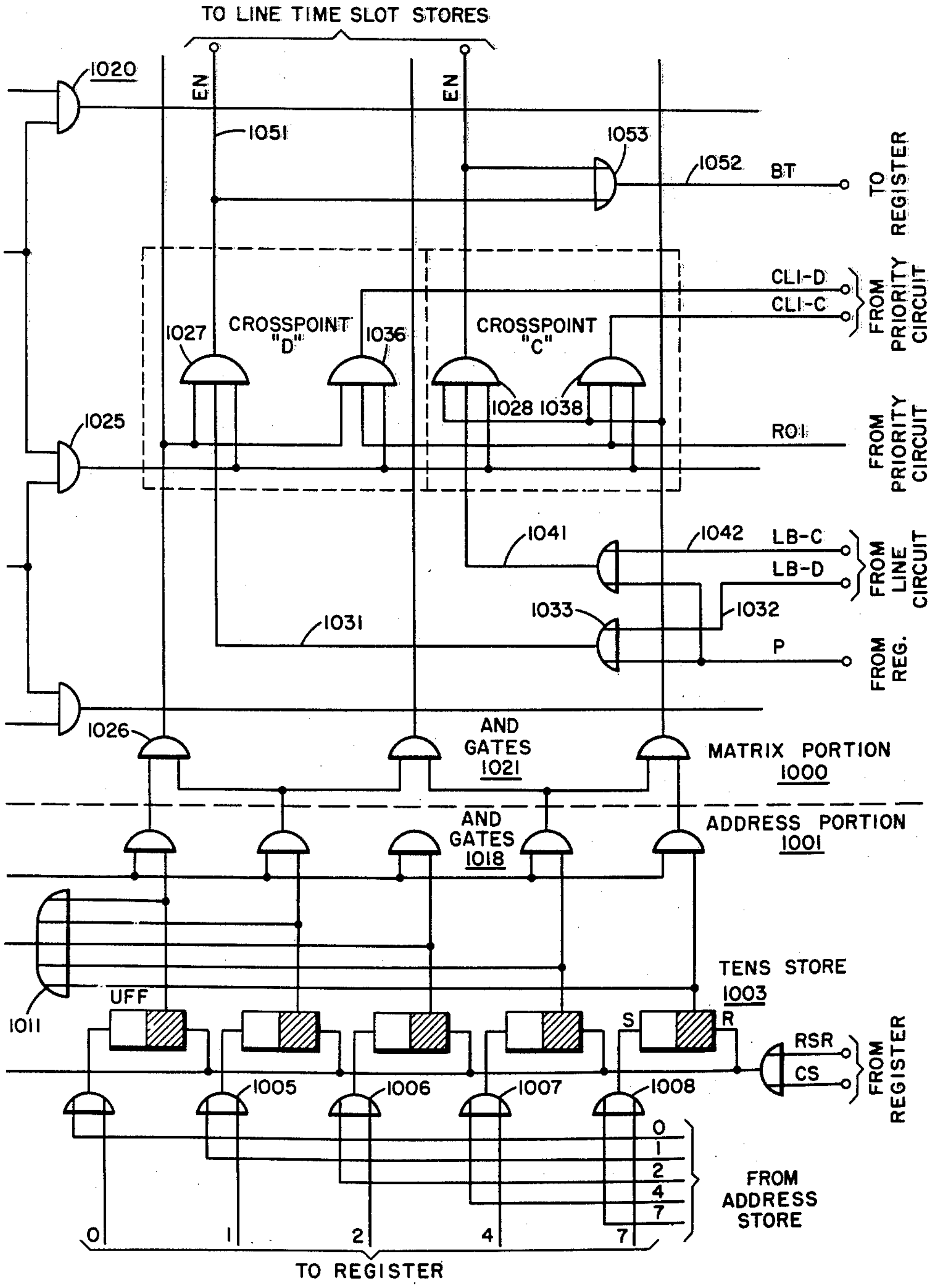
Figure 11A:
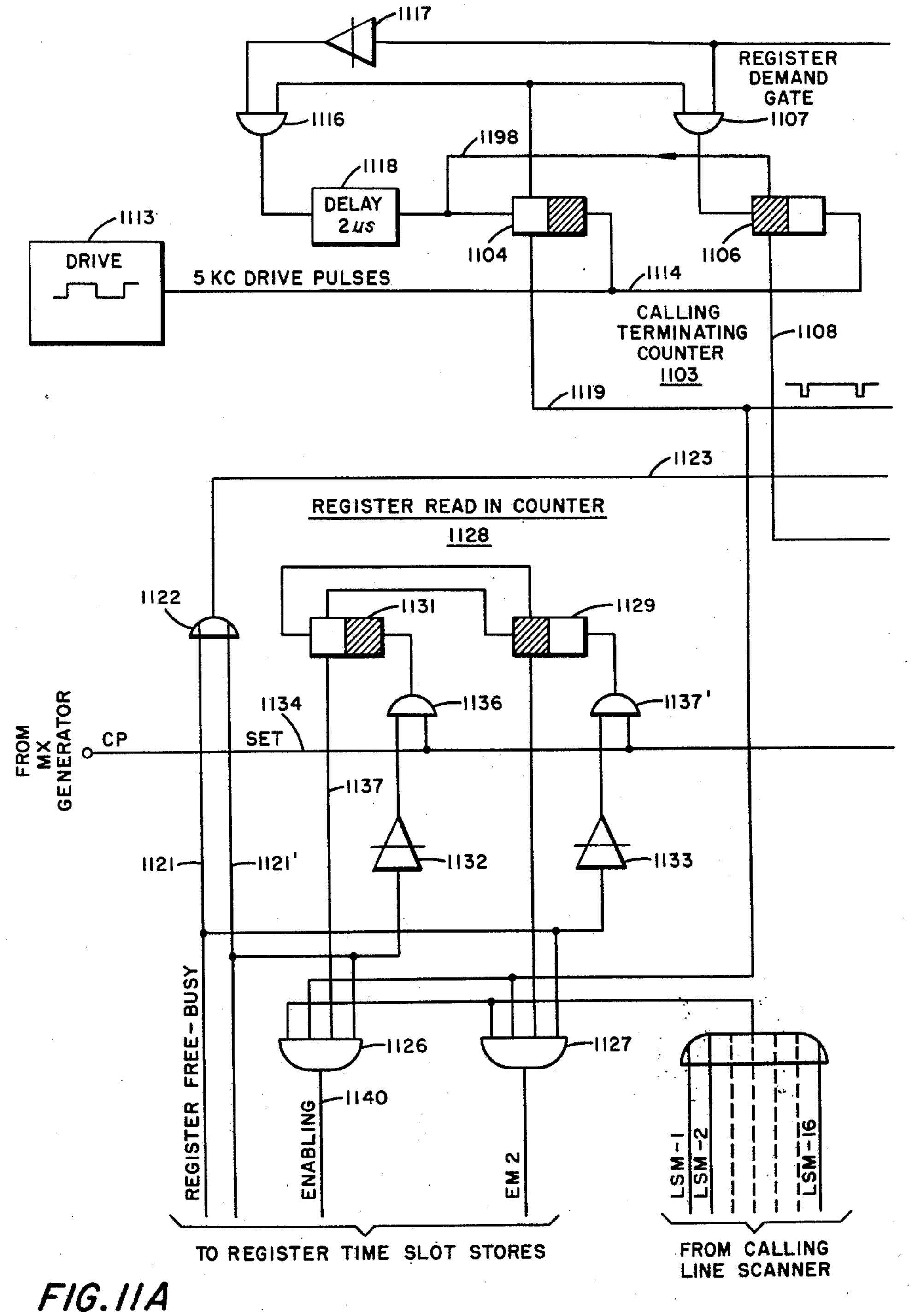
Figure 11B:
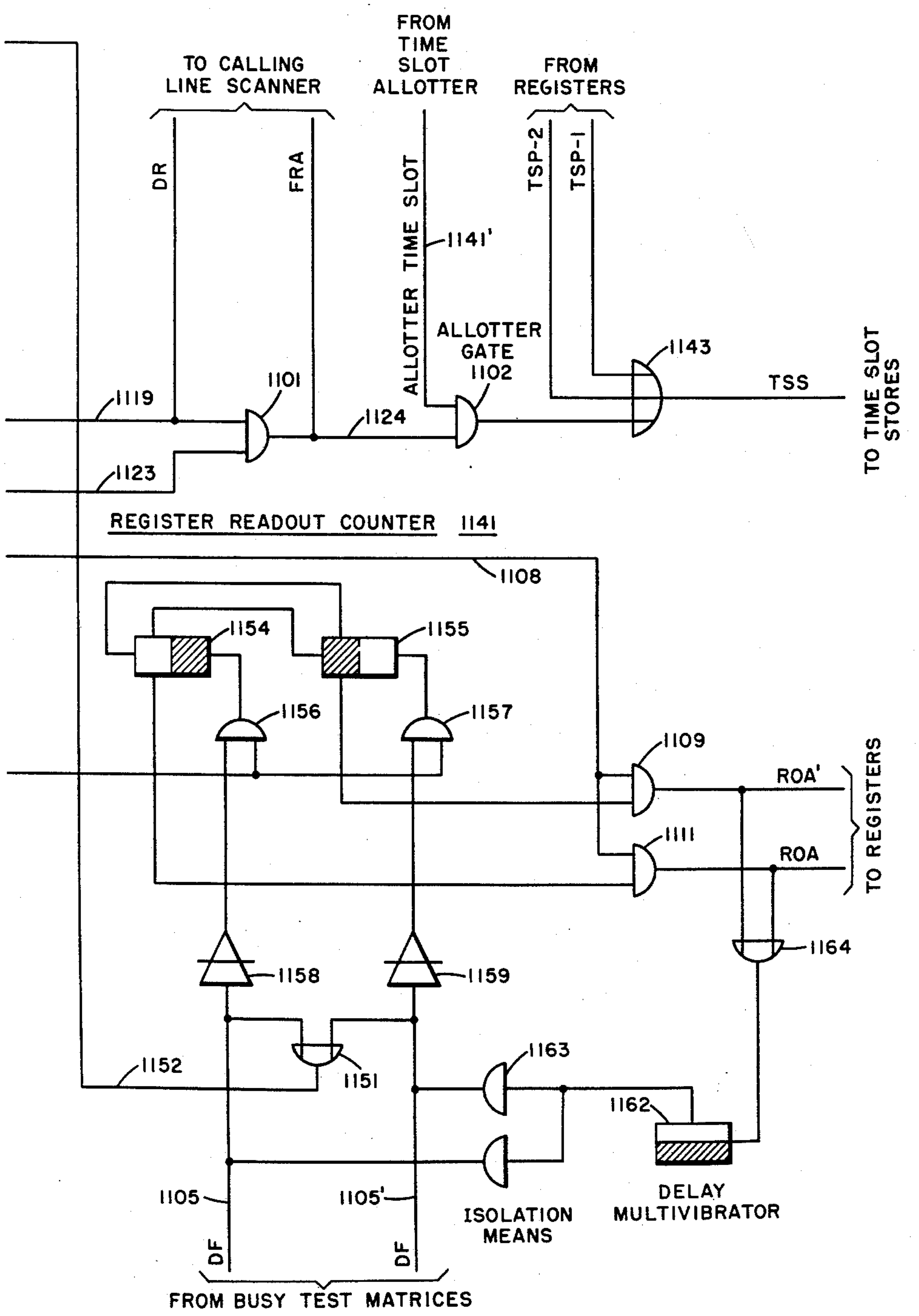
Figure 12A:
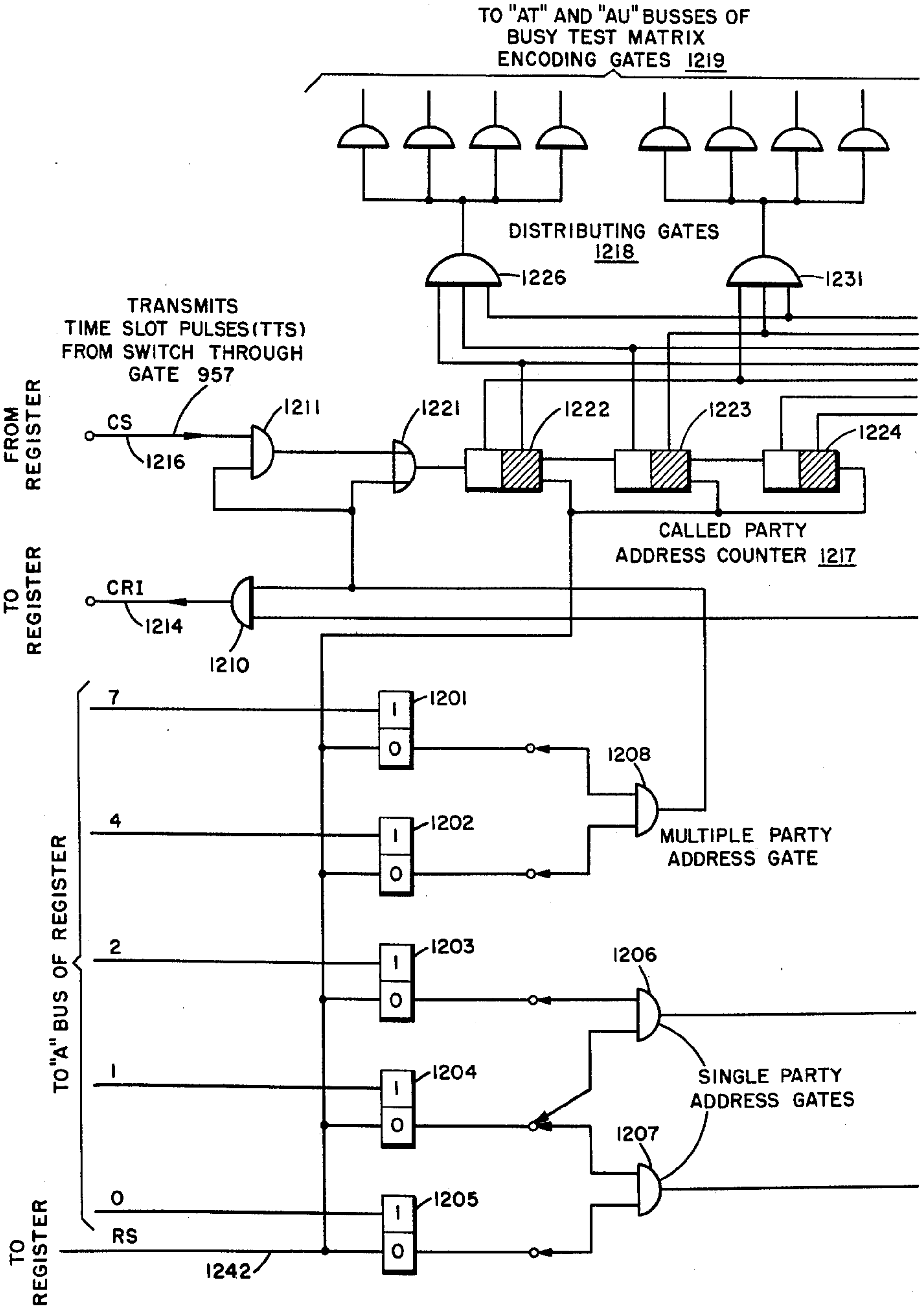
Figure 12B:
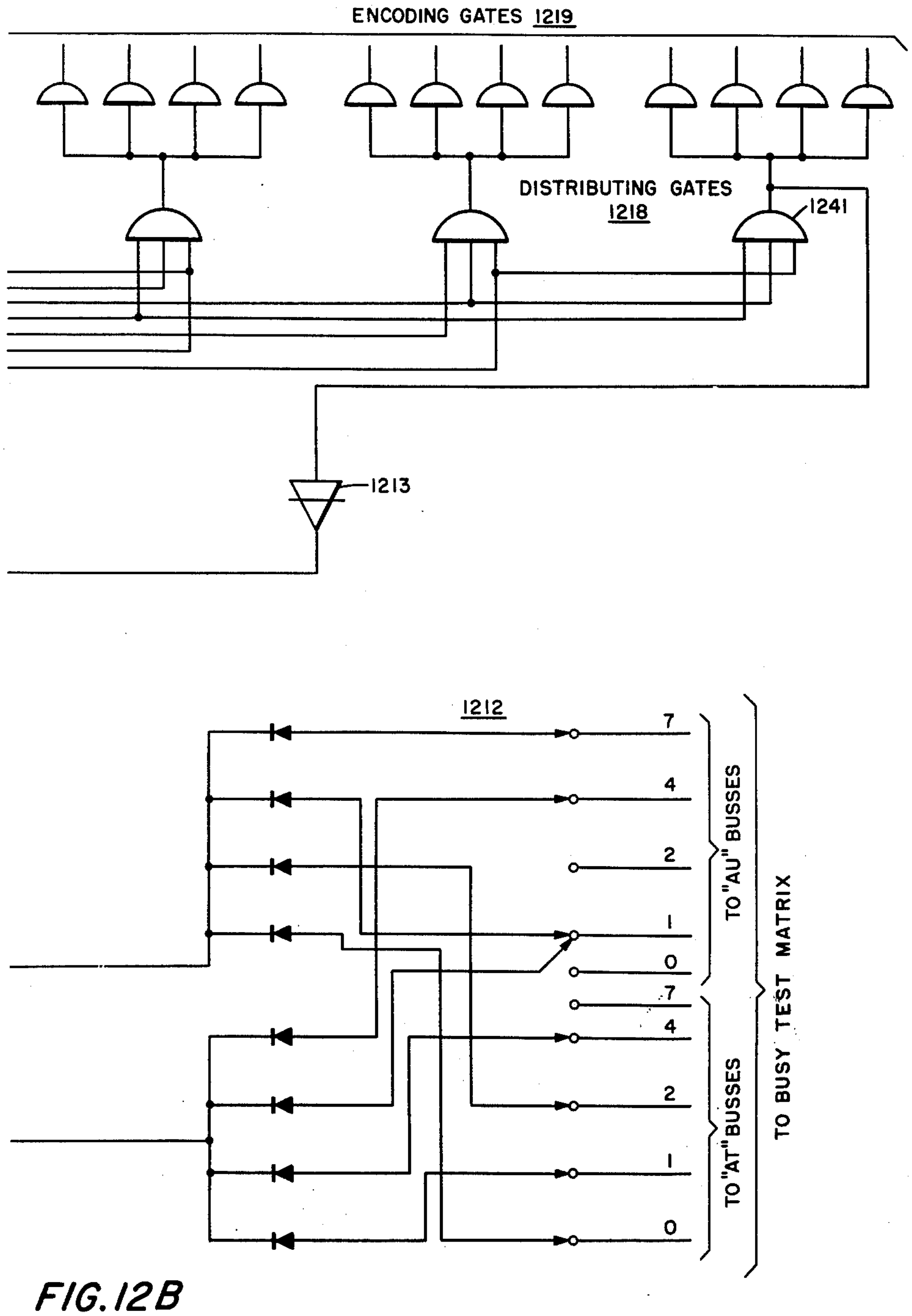

Other objects, features and the attending advantages of the present invention will become apparent from the description which follows taken together with the accompanying drawings, in which:

FIGS. 1A and 1B disclose a schematic diagram of the overall system;

FIGS. 2A and 2B disclose a subscriber subset to be utilized in conjunction with the system;

FIG. 3 discloses a schematic diagram showing the interrelationship between the register circuit, the space division matrix, and the line circuit;

FIG. 4 discloses the line circuit;

FIG. 5 discloses the line time slot store;

FIG. 6 discloses the calling line scanner;

FIG. 7 discloses the time slot allotter;

FIG. 8 discloses the space division matrix;

FIGS. 9A and 9B disclose the register circuit;

FIGS. 10A and 10B disclose the line busy test matrix;

FIGS. 11A and 11B disclose the register allotter;

FIGS. 12A and 12B disclose the stored address circuitry; and

Figure 13A:
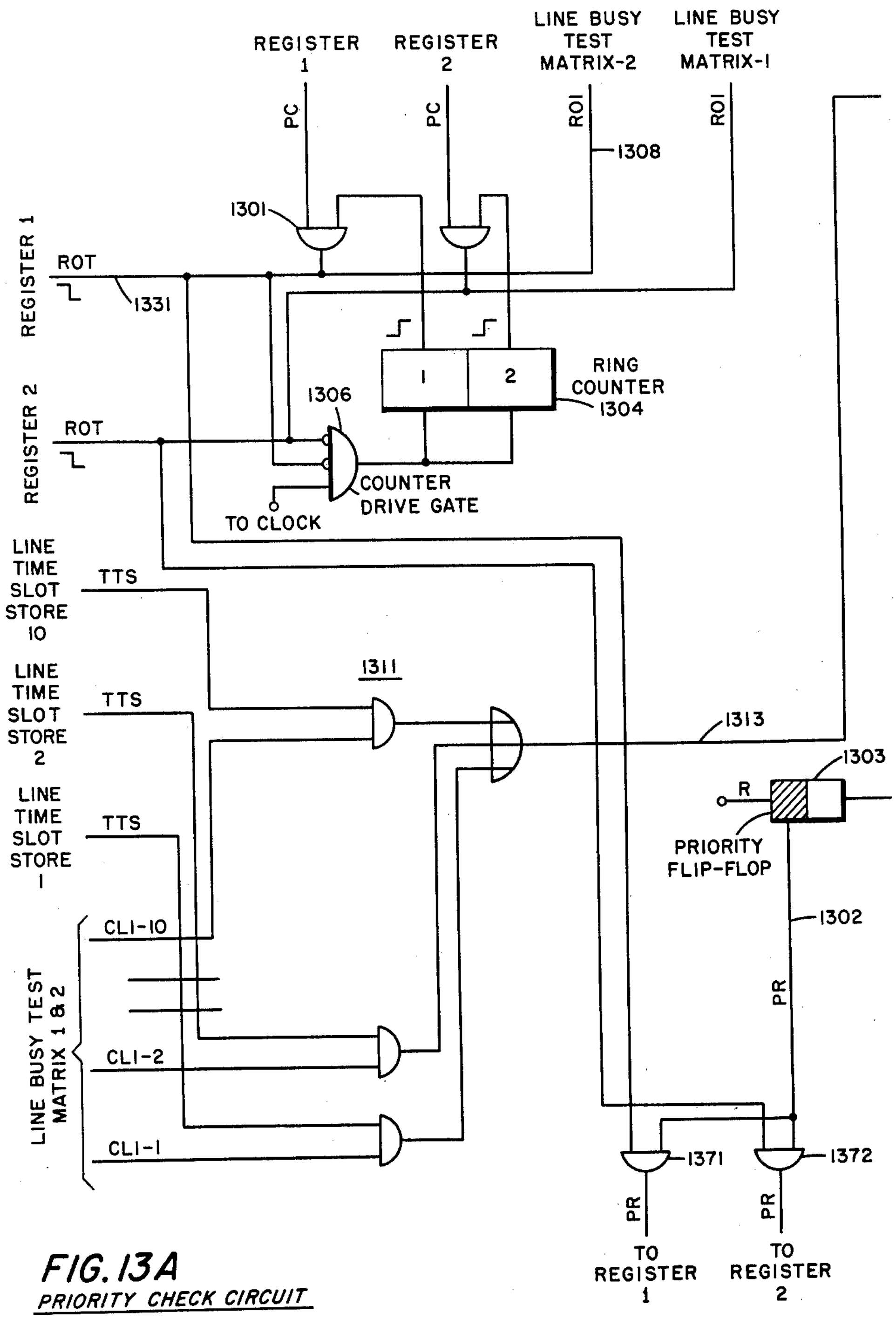
Figure 13B:
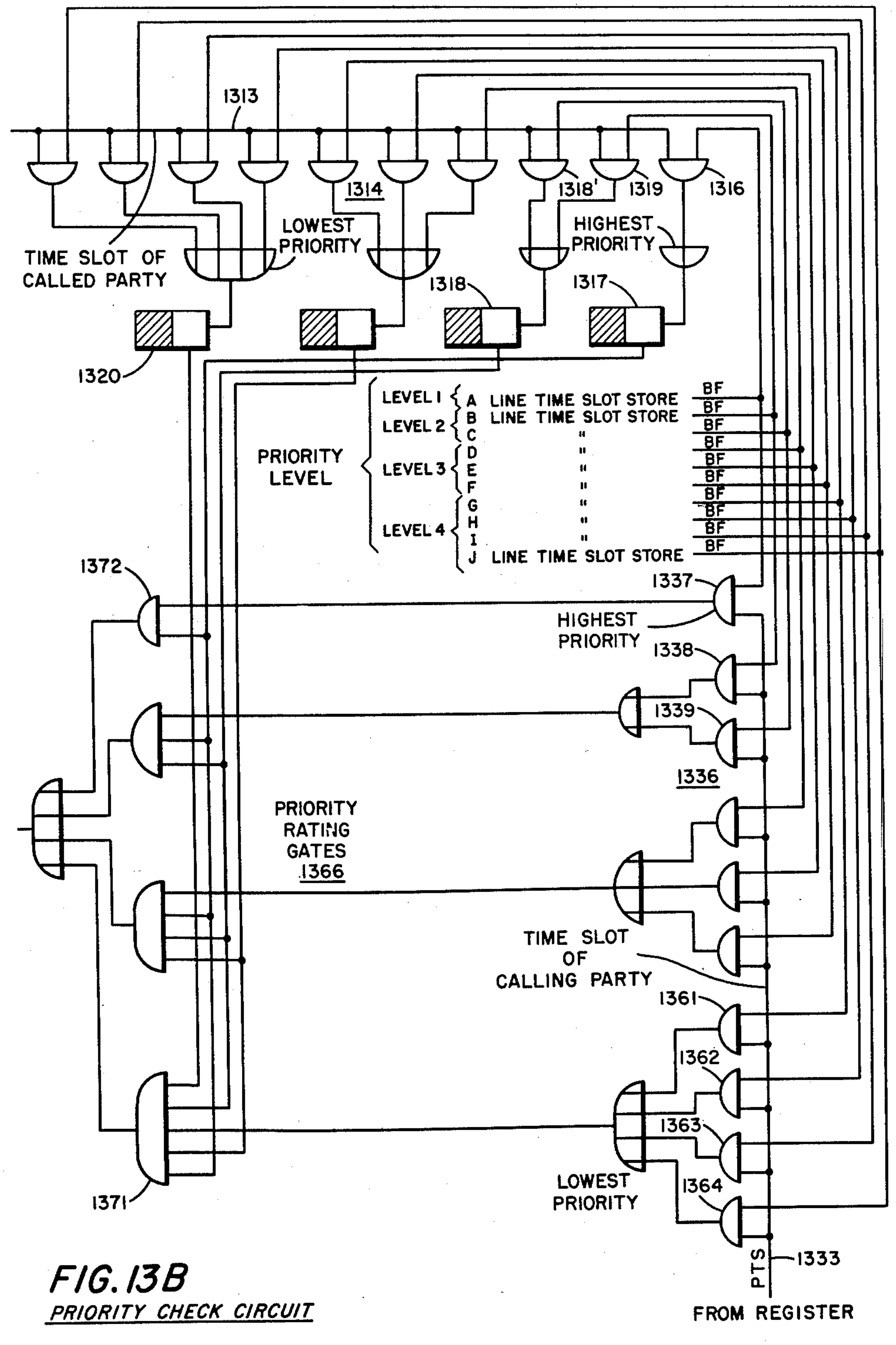

FIGS. 13A and 13B disclose the priority check circuit.

*General Description*

The telephone system of the present invention is schematically represented by the block diagram of FIGS. 1A and 1B and includes N line circuits, each line circuit being coupled to a common transmission channel through N voice gates, as shown. A line time slot store is associated with each line circuit and is utilized principally to control the period during each transmission frame when the associated voice gate is open thereby to couple the line circuit to the common transmission channel. Each transmission frame of 80 microseconds duration comprises thirty-two time slots of 2.5 microseconds each. It follows, therefore, that thirty-two calls may be simultaneously conducted by the particular embodiment of the present invention. Of course, by expanding various circuitry to include another binary stage, sixty-four calls may be handled simultaneously, etc. Broadly speaking, a call is set up when the voice gates of the calling party and of the called party or parties are simultaneously opened once each transmisison frame, during a particular time slot which is assigned to this particular call. The assignment of a free time slot to a particular call is made at random by the time slot allotter and therefore the system may be designated as "free floating." In the particular embodiment disclosed in the accompanying drawings, two registers are disclosed, each having a line busy test matrix associated with. It should be understood, however, that the number of registers is determined by the traffic which is to be handled by the system and that any number of registers may be provided. The line circuits of the system are sequentially scanned by a calling line scanner to determine whether or not service is demanded by the calling party associated with a particular line circuit. An off-hook condition of the subscriber subset associated with a particular line circuit causes this demand signal to be forwarded to the calling line scanner. This action in turn causes the line time slot store of the calling party to be prepared to receive a free time slot from the time slot allotter. One line time slot store is associated with each line circuit, as shown. One register allotter is provided for the system. The register allotter randomly selects a free register and assigns it to the particular call which is being processed. Each register contains a register time slot store which is very similar to the line time slot store. The seizure of a particular register by the register allotter also prepares its register time slot store to receive a free time time slot from the time slot allotter in a similar manner as the line time slot store. A free time slot is thereafter introduced into the calling line time slot store and the register time slot store simultaneously via a time slot set bus (TSS) which is common to all of the time slot stores of the system. After the free time slot is inserted into the calling line time slot store and the register time slot store, it is not longer made available to another calling party except where the calling party is exercising a priority rating which is higher than the priority rating assigned to the line circuits presently utilizing the time slot. A space division matrix is provided for each system, the function of this matrix being to couple the register which has just been assigned to the call being processed to the signaling circuit of the line circuit associated with the calling party. The space division matrix is simultaneously pulsed by the time slots circulating in the calling party's line time slot store and the time slot store of the assigned register and a flip-flop associated with a particular crosspoint of the matrix is operated to open a gate to complete the aforementioned signaling connection between the signaling circuit of the calling party's line circuit and the assigned register. The calling party thereafter transmits two out of a possible five frequency tones to the register where this information is forwarded to the line busy test matrix associated with the assigned register. Two out of five flip-flops are operated in the tens storage bank of the line busy test matrix pursuant to the particular two out of five frequencies transmitted by the calling party to represent the tens digit and two out of five flip-flops in the units storage bank of the line busy test matrix are operated pursuant to the particular two out of five tones which are transmitted by the calling party to represent the units digit. When the aforementioned tens and units storage banks of the line busy test matrix have received the digital information representing the two digits, a supervisory signal is transmitted to the register allotter which isolates the output circuit of the time slot allotter from the time set bus and which transmits a readout signal to the assigned register. The digital information stored in the units storage bank and tens storage bank of the line busy test matrix enables a particular crosspoint of the matrix which crosspoint is coupled to the line time slot store of the called party. If the called party's line time slot store associated with the selected crosspoint is not in use, a signal will be transmitted from the line time slot store of the called party back to the selected crosspoint to indicate that the called party is no busy and that the call may be completed. An enable signal is thereafter transmitted to the called party's line time slot store thereby to prepare it for the reception of the time slot contained in the calling party's line time slot store and the assigned register time slot store over the time slot set bus. The aforementioned readout signal which is transmitted from the register allotter to the assigned register enables gating circuitry, which forwards the time slot circulating in the assigned register time slot store to the register allotter over a time slot pulse lead (TSP). This time slot is impressed upon the time slot set bus (TSS) at the register allotter and the time slot is accordingly introduced into the called party's line time slot store. The calling party's voice gate and the called party's voice gate, both gates being located in their respective line circuits, are now simultaneously pulsed once each transmission frame in the particular time slot which has been assigned to this particular call. Shortly after the call is completed, the register circuit, the line busy test matrix circuit, and the space division matrix circuit are all reset so that these circuits drop out of the picture and so that they may handle another incoming call.

Pre-address circuitry is also provided so that a calling party may depress a single key thereby to call one or more parties. Under the first mode of operation of the system as described hereinabove, the calling party presses the tens digit key and thereafter presses the units digit key to select a particular called party. However, the calling party may depress a single key to set up a call to one or more called parties. If a particular preset address key is depressed, a preset address tone is forwarded to the register circuit along with two signaling tones. The preset address tones cause the two-out-of-five code signal which is transmitted to the register to be steered to a stored address circuit instead of to the tens and units storage banks of the line busy test matrix mentioned hereinbefore. Matrices are provided in the stored address circuit to cause the single set of two out of five tones to select one or more crosspoints of the line busy test matrix. Thereafter, busy tests are carried out in a similar manner as explained hereinbefore and the assigned time slot is inserted into the line time slot stores of one or more called parteis. For the purpose of setting up multiple party pre-address, a binary counting chain is provided in the stored address circuit, having its output circuits coupled to a matrix which in turn is coupled to the line busy test matrix. The transmission of a multiple party pre-address signal causes the counting chain to be stepped, a plurality of crosspoints in the line busy test matrix are sequentially enabled, and consequently the assigned time slot is inserted into the line time slot stores associated with these particular crosspoints to set up a call from a single calling party to a plurality of called parties. A particular two-out-of-five multiple party pre-address code transmitted by the calling party will cause the operation of this counter for the purpose of setting up a multiple party address. Another two-out-of-five code would not cause activation of this counter so that only a single particular crosspoint in the line busy test matrix is enabled, thereby to set up a call to a single called party.

In the event that a calling party receives a busy signal upon attempting to reach a particular called party, if the calling party so desires, he may attempt to exercise his priority thereby to permit him to break into the call being carried on by the called party he is attempting to reach. The calling party attempts to exercise priority by depressing a priority key at his subset which causes a priority tone to be transmitted to the assigned register. A priority check circuit determines whether or not the calling party who is attempting to exercise priority has a higher priority rating than both the called party and the party to whom he is talking. If the calling party attempting to exercise priority has a higher priority rating than both of these parties, the circuitry which would normally return busy tone to the calling party is disabled and the call is switched through in spite of the busy condition. While the calling party is attempting to exercise priority, a priority check tone is forwarded to the calling party.

*Subscriber Subset*

Referring now to FIGS. 2A and 2B, which disclose the subscriber subset in detail, a plurality of signaling keys 201 are provided for transmitting directive information to the bank of detectors in an assigned register, which detectors in turn actuate storage elements which store this information. The actuation of a particular key causes the operation of two of the five detectors in the register. For instance, if key 202 in FIG. 2A is depressed by the calling party, a series circuit comprising capacitor 203 and a portion 205 of inductor 204 is electrically connected across lines 206 and 207. At the same time, a series circuit which comprises capacitor 208, the portion 209 of inductor 210 is also connected across lines 206 and 207. As a result, those oscillators in the register which are operating at frequencies corresponding to the resonant frequencies of the two series circuits mentioned hereinbefore will cease to operate since the two series resonant circuits will electrically short-circuit the tank circuits of these oscillators only, and the associated detectors will produce a mark at their output terminals. Other portions of FIGS. 2A and 2B will be described hereinafter.

FIG. 3 is a schematic diagram of the signaling path disclosed schematically in FIGS. 1A and 1B and connected between the subscriber subset of FIGS. 1A and 1B and the aforementioned detectors in the assigned register, which are utilized to set up the two-out-of-five code combination corresponding to the particular key actuated by the calling party. Although it should be appreciated that the actuation of a particular key of FIGS. 2A and 2B affects two oscillators with their associated detectors, for the purpose of illustrating the interrelation between the subscriber subset and the assigned register as far as the signaling path is concerned, only one series resonant circuit together with an associated oscillator 318 and detector 319 is disclosed in FIG. 3. As will be explained hereinafter, the register time slot store 301 generates a time slot on lead 302 at the same instant that a time slot is produced on lead 303 by the calling line time slot store 304 and as a result AND gate 306 set flip-flop 307 thereby to close gate 308 to complete the connection from the calling party line circuit to a particular register which is to receive the directive information transmitted by the calling party. The operation of switch 309 by the calling party causes the series resonant circuit, which comprises capacitor 310 and inductor 311, to be connected across the primary winding of transformer 312. Because the natural frequency of the series resonant circuit comprising inductor 311 and capacitor 310 is the same as the frequency of the oscillator which is associated with this series resonant circuit, the closing of gate 308 will cause oscillator 318 to become inoperative since the oscillator will "see" a very low impedance across its tank circuit. It should be understood that any well known oscillator may be utilized and the specific circuitry of oscillator 318 is of no patentable moment. The detector 319, which is associated with oscillator 318, comprises bandpass filter 314 and Schmidt trigger 315. Bandpass filter 314 passes the frequency of oscillation of oscillator 318 so that Schmidt trigger 315 is in a first state when oscillator 318 operates. Upon the cessation of operation of oscillator 318, Schmidt trigger 315 reverts to a second state since a voltage is no longer produced at its input circuit. Detector 319 forms no part of the present invention and is disclosed in detail in application Serial No. 814,845, filed May 21, 1959 and assigned to the same assignee as the present invention. In summary, the connection of a particular series resonant circuit across the primary winding of transformer 312 will cause a particular detector within the register, associated with the series resonant circuit, to produce a mark at its output circuit.

As can be seen from FIGS. 2A and 2B, the actuation of any one of the signaling keys 201 will cause two series resonant circuits to be connected across lines 206 and 207, which lines communicate with the primary winding of the transformer of the line circuit of FIG. 4. A bank of preset address keys 211 is also disclosed in FIGS. 2A and 2B. The preset address keys are similar in operation to the signaling keys 201, in that the actuation of any particular one of keys 211 causes two series resonant circuits to be connected across line 206 and 207. In addition, however, the actuation of any particular preset address key 211 causes a series resonant circuit which comprises portion 221 of inductor 224 and capacitor 222 to also be connected across lines 206 and 207, which in turn causes a preset address detector to change its state in the same manner as detector 319 of FIG. 3. The actuation of the preset address detector will produce a chain of events discussed hereinafter in connection with the operation of preset address facility . Priority key 223 is provided to connect the series resonant circuit comprising capacitor 222 and inductor 224 across lines 206 and 207, which action in turn causes the operation of a priority detector in the register circuit in the same manner as the detectors mentioned hereinbefore. The purpose of the priority detector will be discussed in greater detail hereinafter.

Telephone transmitter 217 and telephone receiver 218 are inductively coupled to lines 206 and 207 by transformer 219. Hookswitch 220 is closed when the calling party removes his handset from its associated cradle in the conventional manner, thereby to cause a direct current to flow through lines 206 and 207.

*Line Circuit*

Referring now to FIG. 4, a line circuit is disclosed having lines 401 and 402 which are connected to lines 206 and 207 of FIGS. 2A and 2B. Lines 401 and 402 are inductively coupled to conductor 403 by means of transformer 404. Signaling lead 406 is connected to conductor to conductor 403 and corresponds to the signaling path 320 of FIG. 3.

When the calling party lifts his handset from the cradle of the subset, hookswitch 220 of FIGS. 2A and 2B is closed thereby to cause direct current to flow through resistor 408, inductor 409, conductor 402, conductor 207, inductor 222, closed hookswitch 220, inductor 223, conductor 206, conductor 401, inductor 411, and resistor 412. As a result, calling gate 414 is partially enabled. If a mark is present on line busy conductor 416 indicating that no time slot is circulating in the line time slot store of the calling party, a mark is produced at the output of calling gate 414 which notifies the calling line scanner that service is required. If the calling party has just been called, however, the time slot of the party placing the call will be circulating in the line time slot store of the party presently attempting to place a call and line busy lead 416 will be unmarked so that no signal is forwarded over the service request lead. The aforementioned off-hook condition which marks junction 417 causes a mark which is present on LBM conductor 418 to be removed due to the present of inverter 419. This action prevents a calling party from switching through the line busy test matrix to call the party associated with the line circuit of FIG. 4. At this point, once the hookswitch is removed, the aforementioned off-hook condition which marks junction 417 also inhibits ring control gate 421 due to the presence of inverter 422, and thus the subset of FIGS. 2A and 2B cannot be rung if the subset is in the off-hook condition. If the subset is in the on-hook condition, however, junction 417 is not marked and ring control gate 421 is partially enabled due to the presence of inverter 422. When the party associated with the subset of FIGS. 2A and 2B is called, the line time slot store of FIG. 5, which is associated with the line circuit of FIG. 4, will not produce a mark on LB conductor 416 since a time slot has been inserted in the line time slot store and as a result ring control gate 421 is fully enabled due to the presence of inverter 424 and ring gate 425 is closed thereby to forward ring tone from the ring tone generator (not shown) to the subscriber. The marking of junction 426 cause LBM conductor 418 to become unmarked so that a third party cannot switch a call through to the subscriber subset of FIGS. 2A and 2B when a time slot is circulating in the line time slot store of FIG. 5. Voice gate 427 couples conductor 403, which communicates with the voice gate through low-pass filter 428, to the transmission highway during an interval when the time slot generated by the line time slot store of FIG. 5 is conveyed to the voice gate 427 over TTS conductor 429.

*Line Time Slot Store*

FIG. 5 discloses a line time slot store which is associated with each line circuit of FIG. 4. A conventional binary counting chain 501 is disclosed, which counting chain has an input gate 502. The right-hand side of each flip-flop of counting chain 501 is coupled to the input circuit of amplifier 503 through AND gate 504 and as a result amplifier 503 produces one output pulse for each group of thirty-two input pulses fed into the counting chain by input gate 502. When the line time slot store is not in use (i.e., does not contain a circulating time slot), the start flip-flop 506 continuously produces a mark on LB lead 507. LB lead 507 is connected to LB lead 416 of FIG. 4. When the line time slot store is not in use, no mark is produced on lead 508 and as a result, input gate 502 prevents the clock pulse train from being transmitted to the counting chain 501 and consequently a time slot is not stored or circulated in the line time slot store. However, when calling gate 414 of FIG. 4 is enabled as explained hereinbefore, a mark is forwarded to the calling line scanner which, after a time, produces a mark on LSM lead 511 thereby to partially enable set gate 512. A free assigned time slot will be produced on TSS bus 513 by the slot alotter, the action of which will be explained hereinafter. As a result, start flip-flop 506 is triggered and a mark is produced on lead 508 thereby to cause clock pulses to be introduced into the counting chain 501. Since each transmission frame contains thirty-two time slots and since the binary counting chain 501 produces a pulse at the output circuit of amplifier 503 for every thirty-two clock pulses, a time slot is produced at the output of amplifier 503 having the same time position as the pulse initially appearing on TSS bus 513. Accordingly, it should be obvious that the free time slot produced by the time slot alotter on TSS conductor 513 is continually reproduced at the output of amplifier 503 and on TTS (transmission time slot) conductor 516 and slot allotter advance conductor 517. The pulse produced on slot allotter advance conductor 517 is transmitted back to the slot allotter so that the particular time slot stored in the line time slot store is no longer made available (i.e., is no longer produced on the TSS lead connected to other line time slot stores, in a manner to be explained hereinafter). The triggering if start flip-flop 506 removes the previously existing mark on LB conductor 507 and LB conductor 416 of FIG. 4 thereby to notify the line circuit that the line time slot store is in use. As a result of this action, calling gate 414 is inhibited so the off-hook condition of the subset of FIGS. 2A and 2B will not transmit a demand signal to the calling line scanner, as explained hereinbefore. A second consequence of the removal of a mark on LB507 and LB416 due to the activation of line time slot store is the marking of junction 426 and the removal of a mark on the LBM lead which communicates with the busy test matrix, as explained hereinbefore. The removal of a mark on the LBM lead prevents a calling party from switching through the busy test matrix to the subset of FIGS. 2A and 2B when a time slot is circulating in the line time slot store (i.e., when start flip-flop 506 is set to remove a mark on LB conductor 507).

TTS lead 516 is connected to the control terminal of voice gate 427 of FIG. 4 so that the line circuit of FIG. 4 is coupled to the common transmission channel during a particular assigned time slot in each transmission frame, this assigned time slot corresponding to the time slot originally present on TSS conductor 513, which sets flip-flop 506. Slot allotter advance lead 517 is coupled to the slot allotter for the purpose of making the time slot, which is circulating in the line time slot store of FIG. 5, unavailable to other parties. A pulse produced on reset conductor 522 will reset the binary counting chain 501 and cause start flip-flop 506 to become reset thereby to prevent clock pulses from being transmitted to counting chain 501 through input gate 502 and "empty" the time slot store. Enabling lead 519 is utilized to trigger the start flip-flop 506 in the event that the subscriber associated with the line time slot store of FIG. 5 is being called. In this case, LSM lead 511 does not function to prepare the setting of start flip-flop 506 since the calling line scanner is not activated by a demand signal at this time. Enabling lead 519 is connected to the line busy test matrix and a mark will appear on enabling lead 519 when a calling party is able to switch through the line busy test matrix. At this time, TSS lead 513 is being pulsed by the time slot circulating in the assigned register time slot store and start flip-flop 506 will be triggered thereby to cause the aforementioned time slot to also circulate in the line time slot store of FIG. 5 which, in this case, is the called party's line time slot store. In the event that the line time slot store of FIG. 5 is functioning as the called party line time slot store and in the event that a party having high priority wishes to terminate the aforementioned call, a mark will be produced on enabling lead 519 which will cause reset bus 522 to be pulsed due to the enabling of reset gate 521. Normally, the aforementioned marking of enabling lead 519 would have no effect on the reset bus 522 since flip-flop 506 is not set and hence reset gate 521 is not enabled. The operation of the priority circuitry will be explained hereinafter.

*Calling Line Scanner*

FIG. 6 discloses the calling line scanner which functions to sequentially scan each line circuit to determine whether or not service is being demanded by an off-hook condition of the subscriber's handset. The scanner comprises sixty-four AND gates divided into eight rows of eight gates each. The AND gates in the first row are partially enabled by the action of ring counter 601 before the AND gates in the second row (not shown) are enabled. Counter 601 is driven by drive pulses generated in the register allotter and transmitted to the input circuit of counter 601 through input gate 602 and frequency divider 602'. If a mark appears on free register available lead FRA, counter 601' will be stepped every two hundred miscroseconds. Since each transmission frame has a duration of eighty microseconds, it follows that counter 601' will step every two and one-half transmission frames so that each line is scanned for two and one-half transmission frames. At the beginning of the cycle of operation, a mark appears on leads 608 and 609. The marking of leads 608 and 609 along with the marking of the free register available lead which communicates with the register allotter, as will be explained hereinafter, will cause a mark to be forwarded on lead 605 providing the line circuit associated with gate 606 is requesting service, because if such is the case, service request lead 607 which communicates with its associated line circuit, will be marked as explained hereinbefore in connection with FIG. 4. The mark present on LSM lead 605 is forwarded to the proper line time slot store to trigger the start flip-flop as explained previously in connection with FIG. 5. The fast ring counter 601' steps eight times for every step of slow ring counter 601. Marks are sequentially produced on leads 611 while a mark continues to be present on lead 608 and as a result the first row of AND gates of the matrix are sequentially partially enabled. After lead 612 of fast ring counter 601' is marked, lead 609 will again be marked and a mark will appear on the second output lead 613 of slow ring counter 601 and the previously existing mark on lead 608 will be removed and the process is repeated so that each AND gate in the second row of AND gates is partially enabled. This process is continued until each gate in the last row of AND gates is sequentially enabled. It should be noted that the continuation of the scanning process is dependent upon the existence of mark on the free register available lead and if no registers are available, the scanning process halts because input gate 602 is no longer enabled. In addition, marks present on the service request leads cannot be transferred to the line time slot stores because no mark is present on the free register available lead which enables all of the AND gates of the matrix.

*Time Slot Allotter*

FIG. 7 discloses the time slot allotter which functions to provide free time slots to be assigned to the calling line time slot store, the register time slot store and the line time slot store associated with a particular called party. If a particular time slot is already being used by two or more parties communicating with one another, it follows that circuitry must be provided for preventing this time slot from being utilized by other parties. The time slot allotter comprises a binary counting chain 701 which is driven by a train of clock pulses from the clock pulse source or "MX" generator having a frequency of 400 kilocycles. These pulses are continuously transmitted to binary counting chain 701 as long as a mark appears on lead 702 thereby to enable AND gate 703. Since the pulses of the clock pulse train of 400 kc. are each 2.5 microseconds in width and since binary counting chain 701 will cause an output pulse to be produced on the output lead of AND gate 704 for every thirty-two input pulses, it follows that pulses will be produced at the output of AND gate 704 once each transmission frame. The output circuit of AND gate 704 is coupled to the input circuit of AND gate 706 through amplifier 707. The output circuit of amplifier 707 is also coupled to allotter advance gate 708, the output circuit of which is coupled to the input circuit of AND gate 703 through inverter 709. Slot allotter advance lead 710 is coupled to the input circuit of gate 706 through inverter 711 and is also coupled to the slot allotter advance leads of every line time slot store and as a result each time slot which is in use, i.e., which is circulating in one or more line time slot stores, will be present on slot allotter advance lead 710. Let us assume that the fourteenth time slot is produced at the output circuit of amplifier 707. If this particular time slot is not in use, i.e., is not circulating, in any line time slot store, a mark will not be present on slot allotter advance lead 710 and due to the action of inverter 709, a mark will be present on lead 702 so that the counting chain is not permitted to "slip" and as a result the fourteenth time slot is continually produced once each transmission frame at the output circuit of amplifier 707. As long as the fourteenth time slot is not in use, inverter 711 will permit AND gate 706 to convey the fourteenth time slot on the time slot set bus (TSS) so that this time slot may be inserted into the calling line time slot store and the register time slot store. As soon as this occurs, a mark will appear on slot allotter advance lead 710 during the fourteenth time slot and as a result is no longer permitted to be conveyed on the TSS bus because of the action of inverter 711, thereby to prevent its use by any other party. The presence of the fourteenth time slot on slot allotter advance lead 710 will, however, cause the removal of a mark on lead 702 due to the action of inverter 709 and as a result, binary counting chain 701 is permitted to "slip" one time slot so that the thirteenth time slot is now produced once each transmission frame at the output circuit of amplifier 707. If the thirteenth time slot is in use, AND gate 706 will be inhibited as explained hereinbefore and the thirteenth time slot will not be permitted to appear on the TSS bus. In addition, the presence of the thirteenth time slot on slot allotter advance lead 710 will again cause the counting chain to "slip" due to the action of inverter 709, so that the twelfth time slot will be generated by the time slot allotter and the process continues until a time slot is produced on the output circuit of amplifier 707 which is not in use. At this time, inverter 709 prevents the counting chain 707 from "slipping" and inverters 711 and 706 cause the free time slot to be produced once each transmission frame on the TSS bus, via the ATS bus.

*Space Division Matrix*

FIG. 8 discloses the space division matrix disclosed schematically in FIG. 3 and discussed hereinbefore. When a free time slot from the slot allotter causes a time slot to circulate in the line time slot store, it also causes the same time slot to be introduced into the register time slot store of a free register which has just been allotted to the particular call. Accordingly, the particular register which has just been allotted to a particular line circuit will contain the same time slot in its register time slot store as the time slot contained in the line time slot store. Assuming the first register has been allotted to the line circuit associated with line time slot store "A," a time slot will appear on lead 821 which is coupled to lead 526 of line time slot store "A" of FIG. 5, and simultaneously on RTS lead 802, which is connected to the output circuit of the register time slot store of the first register, and as a result AND gate 803 will cause bistable element 804 to change its state thereby to enable matrix audio gate 806. Bistable element 804 remains set until the reset lead 807 is pulsed by circuitry in the register to be explained hereinafter. The closing of matrix audio gate 806 causes the signaling lead 810, which is connected to signaling lead 406 of the line circuit of FIG. 4 to be connected to signaling lead 813 to complete the signaling connection to the first register from line circuit "A." After the two-out-of-five code is transmitted from the subscriber subset and the line circuit to the assigned register over signaling leads 810 and 813, and after this information has been stored by the register, the register pulses reset lead 807 and bistable element 804 is reset thereby to reopen matrix audio gate 806 and to sever the signaling connection. Where a system utilizes N registers, N rows of matrix audio gates are provided.

In summary, the function of the space division matrix of FIG. 8 is to complete the signaling path from a particular line circuit to a particular register which is to receive and store the directive information transmitted by the line circuit. This function is schematically disclosed in FIG. 3 and was briefly discussed in connection with that figure.

*Register*

The register of FIGS. 9A and 9B include a register time slot store which is similar to the line time slot store of FIG. 5 except that the slot allotter advance output lead 517 of FIG. 5 has been eliminated and only one enabling lead 901 is utilized to enable the set gate which coupled the time slot set bus to the input circuit of the start flip-flop of the time slot store. An idle register, such as the register of FIGS. 9A and 9B, is allotted by the register allotter as will be explained hereinafter, and the register time slot store is activated simultaneously with the line time slot store so that both stores contain the same circulating time slot. The time slot circulating in the register time slot store and the line time slot store are effective to close the signaling path between line circuit conductor 406 and signaling conductor 902, as explained hereinbefore. The calling subscriber hears a dial tone in his subset receiver due to the concurrent operation of all of the oscillators 904. This complex dial tone informs him that the register is prepared to accept directive information and he proceeds to actuate one or more of the keysets of FIGS. 2A and 2B as explained hereinbefore.

Two out of the five detectors 906—910 are triggered by the transmission of the two-out-of-five signal code and, accordingly, two marks are produced in the output circuits of the detectors. At this time, pre-address flip-flop 914 is in its reset condition because an address signal has not been transmitted so that a triggering mark is not produced at the output of the "A" detector 911. Second digit flip-flop 920 is also in its reset condition, as shown, so that marks are produced on the output leads 916 and 926 thereby to cause a mark to be produced on output lead 927 of AND gate 917 and as a result the tens store AND gates 928—932 are partially enabled. The two marks produced at the output circuits of the detectors pass through two of the AND gates of the tens store and are forwarded to the line busy test matrix where they trigger bistable circuit elements in the tens storage bank of the line busy test matrix. Upon cessation of the transmission of the two-out-of-five code indicative of the tens digit, the aforementioned two marks are removed, which action causes the second digit flip-flop 920 to become set so that the mark previously produced on lead 926 is removed and a mark is produced on lead 934. This action causes a mark to be produced at the output circuit of second digit gate 936 thereby to enable the units store AND gates 940—944 and to disenable the tens store AND gates 928—932. Marks are again produced on two out of the five output leads of the detectors which are indicative of the units code transmitted by the calling party. These marks are passed through two of the five units store AND gates 940—944 thereby to set two out of five bistable elements in the units storage bank of the line busy test matrix. The removal of these marks from the output circuits of the detectors causes second digit flip-flop 920 to become reset thereby to produce a carry pulse on output lead 966 which pulse causes preset address flip-flop 914 to become reset in the event that it was previously set for reasons to be explained hereinafter.

In summary, flip-flops 914 and 920 together with associated AND gates steer the incoming two-out-of-five code signals to the appropriate banks of bistable elements in the line busy test matrix. The remaining elements of FIGS. 9A and 9B will be discussed hereinafter in connection with the operation of other circuits.

*Line Busy Test Matrix*

FIGS. 10A and 10B disclose the line busy test matrix which is divided into a matrix portion 1000 and an address portion 1001. In the event that the telephone system of the present invention utilizes two registers, two line busy test matrices of FIGS. 10A and 10B may be provided. However, if desired, matrix portion 1000 may serve two or more registers providing two or more address portions 1001 are provided, one address portion for each register. However, to simplify the drawings, it will be assumed that two line busy test matrices of FIGS. 10A and 10B are provided for two registers of FIGS. 9A and 9B. Tens store 1003 comprises five flip-flops which are coupled to the output circuits of AND gates 928—932 so that two of the five flip-flops will be set upon receipt of two marks from two of the five AND gates 928—932. Units store 1002 also comprises five flip-flops which, in like manner, store the two-out-of-five code which is representative of the units digit. These flip-flops are coupled to AND gates 940—944 through associated OR gates. After the units and tens binary information is received and stored by the units store 1002 and the tens store 1003, two out of the five input leads to OR gate 1010 are marked and, in like manner, two out of the five input leads to OR gate 1011 are also marked due to the setting of two out of five of the flip-flops in each store. Since the output circuits of OR gates 1010 and 1011 are coupled to the input circuit of AND gate 1012, a mark will be produced upon IF lead 1014 which causes circuitry within the register allotter, to be explained hereinafter, to transmit a mark on readout lead ROA 1016 which enables the bank of AND gates 1017 and the bank of AND gates 1018. The output circuits of AND gates 1017 are coupled to AND gates 1020 in such a way that the two-out-of-five code will be reconverted by the AND gates 1020 into a decimal type code. In like manner, AND gates 1018 are connected to the bank of AND gates 1021 in such a manner that the two-out-of-five code is translated to a decimal code at the output circuits of AND gates 1021. Thus, it should be apparent that the binary information stored in the units store 1002, which takes the form of a two-out-of-five code, is translated by a matrix comprising AND gates 1017 and AND gates 1020 to a one-out-of-ten code and, accordingly, only one of AND gates 1020 will produce a mark at its output circuit and, in like manner, only one of AND gates 1021 will produce a mark at its output circuit. For instance, assume the binary information in units store 1002 causes a mark to be produced at the output circuit of AND gate 1025 and assume that the binary information stored in tens store 1003 causes a mark to be produced at the output circuit of AND gate 1026. AND gate 1027 which is located at the crosspoint of the output leads of AND gates 1025 and 1026 is partially enabled so that a mark on the third input conductor 1031, connected to AND gate 1027, will cause a mark to be produced on the output lead of this AND gate. No other AND gate in the matrix which corresponds to AND gate 1027 will be able to produce a mark at its output circuit because no other AND gate corresponding to AND gate 1027 has two of its input leads marked by AND gate 1025 and AND gate 1026. Crosspoint "D," which contains AND gate 1027 (and AND gate 1036 whose function will be explained in connection with the priority circuit of FIGS. 13A and 13B) is associated with line circuit "D" and line time slot store "D." In like manner, crosspoint "C," which contains AND gate 1028 and AND gate 1038 is associated with line circuit "C" and line time slot store "C." It should be apparent that for each line circuit and line time slot store, there wi.l be a crosspoint which comprises a pair of AND gates such as AND gates 1027 and AND gates 1036. AND gate 1028 corresponds to AND gate 1027 in function. Input lead 1031 of and AND gate 1027, which has already been partially enabled by the marking of two of its input leads, is coupled to LB lead 1032 through OR gate 1033. LB lead 1032 is connected to LB lead 507 of line time slot store which is associated with crosspoint "D" and which is also associated with line circuit "D," shown in FIGS. 1A and 1B. In like manner, lead 1041 is coupled to LB lead 507 of line time slot store which is associated with line circuit "C." As explained in connection with the line time slot store of FIG. 5, a mark is produced on lead LB 507 when a time slot is not circulating in the line time slot store and start flip-flop has not been set. When a time slot is introduced into the time slot store, start flip-flop 506 becomes set and a mark is removed from LB lead 507. Accordingly, if line time slot store "D" has no time slot circulating within it (i.e., the called party is not talking or being called by another), a mark will be produced on lead 1031 and AND gate 1027 will mark BT conductor 1051, which is connected to OR gate 1053. The production of a mark on the output lead of AND gate 1027 indicates that a busy test has been performed and that line circuit "D" is not in a busy condition because a time slot is not circulating in its associated line time slot store. The output conductor 1051 of AND gate 1027 is connected to enabling lead 519 of the line time slot store which is associated with the line circuit "D." This mark partially enables set gate 512 as previously explained in connection with the description of the line time slot store of FIG. 5. The mark produced on BT lead 1052 by AND gate 1027 partially enables switchthrough gate 957 of the register of FIGS. 9A and 9B because BT lead 1052 of the line busy test matrix is connected to BT lead 956 of the register of FIG. 9A. The register allotter produces a mark on ROA lead 958 of the register thereby further enabling switchthrough gate 957. The time slot, which is produced once each transmission frame at the output of the register time slot store, is transmitted via the TTS lead through the switchthrough gate 957 and is impressed upon the TSP conductor 958, which is coupled to the TSS bus through an OR gate in the register allotter. Thus this time slot will be inserted in called line time slot store "D" due to the production of a mark at the input of set gate 512 by AND gate 1027. The result is that the called line time slot store produces the same time slot on its TTS bus as the time slot circulating in the register time slot store and in the calling line time slot store. The register time slot store is released as will be explained thereinafter and the voice gates of the calling and called party are simultaneously enabled by the same time slot which is circulating in both the calling line time slot store and the called line time slot store. The remaining structure disclosed in FIGS. 10A and 10B will be explained hereinafter in connection with the pre-address circuitry and the priority circuitry and the register allotter.

In summary, the function of the line busy test matrix is to determine whether or not a line time slot store associated with a called party's line circuit contains a time slot. If the line time slot store associated with the called party's line circuit contains a time slot, the called party is busy or being called by another, and set gate 512 of the called party's line time slot store is not partially enabled by a mark forwarded from the line busy test matrix. In the event that no time slot is circulating in the line time slot store of the called party, a mark will be produced on the output lead of the particular crosspoint AND gate selected by the tens and units stores and set gate 512 of the line time slot store associated with this crosspoint will be partially enabled so that the time slot which is circulating in the calling line time slot store and in the register time slot store will be inserted into the line time slot store associated with the called party, thereby to couple the calling and called parties together during the same time slot in each transmission frame via the common transmission channel.

In the event that AND gate 1027 does not produce a mark on its output lead 1051 due to the fact that the set flip-flop in the called party's line time slot store is already set, a mark does not appear on BT lead 1052 and 956, as previously explained, and accordingly switch-through gate 957 is not enabled. In this case, a mark is produced by the action of inverter 961 on a first input lead of busy set gate 962. The register-enabling mark produced on conductor ROA 958 by the action of the register allotter causes the busy set gate 962 to produce a mark upon its output lead 964. When the mark produced at the output circuits of detectors 906—910 and indicative of the second digit transmitted by the calling party is removed, the second digit flip-flop 920 is reset to its initial condition thereby to produce a carry pulse on conductor 966 to set pre-address flip-flop 914. The setting of preset address flip-flop 914 causes a mark to be removed from the junction 916, which in turn causes a mark to be applied to the input lead 971 of busy indication gate 972. The mark which is produced on output conductor 974 of busy indication gate 972 causes the setting of busy flip-flop 976 thereby to produce a mark on input conductor 977 of busy tone gate 978. The time slot which is produced on the TTS output conductor of the register time slot store once each transmission frame passes through the partially enabled busy tone gate 978 so that busy gate 979 is opened during this time slot. At this time, priority flip-flop 983 is in the reset state so that a mark is produced on lead 984 which is connected to the priority flip-flop 983 and, accordingly, busy tone is applied to the input circuit of busy gate 974 by gate 981. Since the busy gate 979 is being controlled by the same time slot which is being applied to the line gate of the calling party's line circuit, the calling party will hear a busy tone and he will replace his handset upon his hookswitch. The mark which is produced by busy flip-flop 976 upon its output conductor 977 will be conveyed through delay means 986, OR gate 987, and AND gate 988 so that the various flip-flops in the register and line busy test matrix are simultaneously reset, thereby to prepare the register, with its associated line busy test matrix, for another call. The flip-flops of the space division matrix are also reset at this time so that the signaling lead 406 of the line circuit is disconnected from the signaling lead 902 of the register. In the event that the called party's line time slot store contains no time slot, a mark will be produced as explained hereinbefore upon conductor 956 and due to the action of inverter 961, the busy set gate is not enabled so that the busy tone generator cannot transmit busy tone to the calling party.

*Register Allotter*

The general purpose of the register allotter of FIGS. 11A and 11B is to coordinate the operation of the circuits of FIGS. 1–10. When service is being demanded by a calling party, the register allotter circuit couples the output lead of the time slot allotter to the time slot set bus (TSS) for a short period so that a free time slot may be inserted into the calling line time slot store. The register allotter assigns a free register to the calling party at this time and the register time slot store of the free register is also coupled to the time slot set bus along with the calling line time slot store so that both the register time slot store and the calling line time slot store receive the free time slot from the time slot allotter. Thus, a free register is assigned to a calling party. The register allotter insures the fact that the register time slot store of a second register does not receive the time slot from the time slot allotter. After the directive information transmitted by the calling party enables the called party's line time slot store, the register allotter causes the time slot circulating in the register time slot store and the calling line time slot store to be transmitted to the time slot set bus thereby to insert this time slot into the line time slot store of the called party. When this happens, the register allotter prevents free time slots produced at the allotter time slot output lead of the time slot allotter to be fed to the time slot set bus. If the allotter time slot output lead of the time slot allotter were not isolated from the time slot set bus at this time, the called party's line time slot store would receive the first available free time slot rather than the time slot which is circulating in the register time slot store of the assigned register. The register allotter ensures the transmission of the time slot circulating in the assigned register time slot store to the time slot set bus and prevents the time slot which might be circulating in an unassigned register from being transmitted to the time slot set bus at this time.

Referring now to FIGS. 11A and 11B, AND gate 1101 and allotter gate 1102 in combination with calling-terminating counter 1103 comprises means for coupling the output circuit of the time slot allotter to the time slot set bus (TSS) when a free time slot is being assigned to the calling line time slot store and the register time slot store of the register which is assigned to the calling party. During those time periods when binary information is not stored in the address portions of the line busy test matrices, no mark will be impressed upon the DF leads 1105 and 1105' and consequently AND gate 1107 is not enabled and flip-flop 1106 is in its reset condition, so that no mark is produced on lead 1108 and AND gates 1109 and 1111 are disenabled. A square wave generator 1113 produces a square wave on lead 1114 having a period of two hundred microseconds or two and one-half transmission frames. These drive pulses will not affect flip-flop 1106 when it is in the reset condition due to the fact that AND gate 1107 is disenabled. The drive pulses on lead 1114, however, will cause flip-flop 1104 to become set once every two hundred microseconds. At this time, AND gate 1116 is enabled due to the presence of inverter 1117 and the fact that its input is unmarked, and an impulse is transmitted to delay means 1118 which resets flip-flop 1104 about two microseconds after the impulse is introduced into delay means 1118. Accordingly, flip-flop 1104 is set for a two microsecond period but reverts to the reset condition at the end of the two microsecond interval so that a mark is produced upon lead 1119 during the major portion of each transmission frame. During those periods when flip-flop 1106 remains in its reset condition, the impulses produced on lead 1119 are transmitted to the input circuit of the electronic commutator of the calling line scanner thereby to step the calling line scanner in synchronism with the operation of the flip-flop 1104.

The register free-busy terminal of the register time slot store is connected to OR gate 1122 of the register allotter by means of register free-busy leads 1121 and 1121'. The register free-busy terminal of a register time slot store is equivalent to the LB lead of the calling line time slot store of FIG. 5. Like the LB lead 507 of FIG. 5, register free-busy lead 1121 will be marked if the register time slot store does not contain a time slot, i.e., the start flip-flop is in the reset condition. It follows, therefore, that if any register is available (i.e., its register time slot store does not contain a time slot), a mark will appear on lead 1123 thereby to partially enable AND gate 1101 and allotter gate 1102 will have its input lead 1124 marked for the major portion of the transmission frame when flip-flop 1106 is in a reset condition and when flip-flop 1104 is also in a reset condition.

Register read-in counter 1128 comprises flip-flops 1129 and 1131 together with AND gates 1136 and 1137 which, when enabled, couple lead 1134 which carries a clock pulse train to the input circuits of the flip-flops 1129 and 1131. The output circuit of flip-flop 1131 is connected to the input circuit of flip-flop 1129 and in similar manner the output circuit of flip-flop 1129 is connected to the input circuit of flip-flop 1131. If none of the registers are in a free condition, inverters 1302 and 1303 will produce a mark at each of their respective output leads thereby to partially enable AND gates 1136 and 1137'. Under these conditions, the clock train which is impressed on lead 1304 will be introduced into the input circuits of flip-flops 1129 and 1131 thereby to operate them out-of-phase in the manner of an ordinary two-stage ring counter.

Let it be assumed that the register associated with lead 1121 is in a busy condition but that the register associated with lead 1121' is in a free condition so that a mark is impressed upon lead 1121'. Such a mark will cause a mark which previously existed in the output circuit of inverter 1132 to be removed thereby to disenable AND gate 1136. This action prevents the clock pulse train impressed upon conductor 1134 from further affecting flip-flop 1131 and as a result flip-flop 1131 is held in its reset condition thereby to produce a mark on conductor 1137 to partially enable AND gate 1126. It should be noted that the marked register free-busy lead 1121' is also coupled to an input lead of AND gate 1126. Assuming a calling party is demanding service, a mark will appear on an LSM lead from the calling line scanner so that AND gate 1126 is further enabled. When flip-flop 1104 of calling-terminating counter 1103 becomes reset, a mark will appear as explained hereinbefore on conductor 1119, and AND gate 1126 thereby becomes fully enabled to produce a mark on output lead 1140. Enabling lead 1140 is coupled to enabling lead 901 of the register time slot store schematically disclosed in FIGS. 9A and 9B thereby to enable the register time slot store as explained in connection with the operation of the line time slot store of FIG. 5. The allotter time slot lead 1141', which is connected to the input circuit of allotter gate 1102, is coupled to the output circuit of AND gate 706 of the time slot allotter of FIG. 7. Accordingly, the first available free time slot store will be produced at the output circuit of allotter gate 1102, which has been enabled by a mark on lead 1119, and will pass through OR gate 1143 to be impressed upon the time slot set bus of the system. The register time slot store which is connected to AND gate 1126 is enabled at this time together with the line time slot store, all as previously explained, and consequently both the register time slot store and the calling party's line time slot store will contain the same time slot. The space division matrix is pulsed by the time slots produced by each time slot store to complete the signaling connection between the calling party's line circuit and the register as explained hereinbefore. The calling party transmits directive information which is inserted into the units store and the tens store of the particular register which is assigned to this call and when the insertion of digital information into the address portion 1001 of the line busy test matrix of FIGS. 10A and 10B is complete, a pulse is produced by AND gate 1012 on DF lead 1014 of FIGS. 10A and 10B. DF lead 1014 is connected to DF lead 1105 of the register allotter of FIGS. 11A and 11B and, consequently, a mark is produced by AND gate 1151 on lead 1152. As a result, AND gate 1107 is enabled so that a carry pulse is produced by the setting of flip-flop 1104 which passes through gate 1107 to set flip-flop 1106. At this time, the action of inverter 1117 prevents the resetting of flip-flop 1104 by means of AND gate 1116. Therefore, during the next 200 μs., a mark is produced on lead 1108 which enables readout gates 1109 and 1111 and no mark is produced on lead 1119 so that allotter gate 1102 cannot couple the output circuit of the slot allotter to the time slot set bus. After 200 μs., flip-flop 1106 is reset by a drive pulse and a carry pulse is produced thereby to reset flip-flop 1104.

Register readout counter 1141 comprises flip-flops 1154, 1155, AND gates 1156, 1157, and inverters 1158 and 1159. The operation of register readout counter 1141 is similar to the operation of register read-in counter 1128 and, therefore, the description of the operation of counter 1141 will be omitted. If a mark is produced on DF lead 1105, readout counter 1141 will be halted so that AND gate 1111 (which is associated with the line busy test matrix whose DF lead 1014 is connected to DF lead 1105) is enabled, and as a result a supervisory signal is transmitted over the appropriate ROA lead to the register associated with DF lead 1105 thereby to partially enable switch-through gate 957, which in turn causes the time slot circulating in the register time slot store to pass through the switchthrough gate 957 to be impressed upon time slot pulse lead 958, as explained hereinbefore in connection with the operation of the register of FIGS. 9A and 9B. This time slot will pass through OR gate 1143 of FIGS. 11A and 11B and will be impressed upon the time slot set bus of the system. Since only the called party's line time slot store is enabled at this time, due to the marking of an output lead of the line busy test matrix, such as lead 1051, the time slot will be introduced into the line time slot store of the called party. This action completes the voice path between the calling and called parties since their associated time slot stores will cause the line gates of the parties to be coupled to the common transmission channel during the same time slot in each transmission frame. When the flip-flops of the units store 1002 and tens store 1003 are reset as explained hereinbefore, the DF mark previously existing upon DF lead 1014 is removed, thereby to disenable AND gate 1107 and reenable AND gate 1116. This action causes flip-flop 1106 to become reset and remain reset so as to disenable gates 1109 and 1111, and to cause flip-flop 1104 to remain reset for the 198 μs. period thereby to reenable AND gate 1101. When flip-flop 1106 becomes reset, the previously existing mark on conductor 1108 is removed thereby to disenable AND gates 1109 and 1111. The removal of the mark from the DF lead causes AND gates 1156 and 1157 to become reenabled thereby to cause the action of register readout counter 1141 to resume.

The purpose of delay multivibrator 1162 is to prevent a first calling party assigned to a first register from unduly holding up the call of a second party assigned to a second register. If the calling party assigned to the first register should remain off-hook after receiving a busy signal without attempting to exercise his priority within a reasonable time, delay multivibrator 1162 will cause the mark present on the DF lead associated with the first register to be temporarily removed so that the register readout counter may be operated to attempt to complete the call of the second party assigned to the second register. The counter may thereafter return to attempt to read out the time slot circulating within the first register time slot store if and when the first party attempts to exercise priority and is successful in so doing.

In summary, the function of the register read-in counter 1128 is to enable the time slot store of an assigned register so that it might be prepared to receive a free time slot which is simultaneously assigned to a calling line time slot store. The purpose of the register readout counter 1141 is to signal the assigned register so that it might return the time slot circulating in the assigned register time slot store back to the register allotter to be forwarded to the time slot set bus thereby to cause the time slot to be inserted into the called party's line time slot store. The purpose of the calling-terminating counter 1103 is to couple the output circuit of the time slot allotter circuit to the time slot set bus at certain times so that free time slots may be assigned to a calling party line time slot store and an assigned register time slot store. Calling-terminating counter 1103 will at other times decouple the output circuit of the time slot allotter from the time slot set bus so that a free time slot produced by the slot allotter cannot be impressed upon the time slot set bus and time slots circulating in an assigned register may be impressed upon the time slot set bus so that the line time slot of the called party may receive the calling party's time slot.

*Single Party Pre-Address*

In the event that the calling party causes a mark to be produced at the output of the address detector 911 by pressing one of the preset address keys 209 of FIGS. 2A and 2B, preset address flip-flop 914 is set thereby to enable AND gates 981—985 and to disenable first digit gate 917 and second digit gate 936. At this time, marks will be produced in the output circuits of two of the five detectors 906—910, as previously explained. Because second digit gate 906 and first digit gate 917 are disenabled and because AND gates 981—985 are enabled, one or more of flip-flops 1203, 1204, and 1205 will produce marks in their output circuits which in turn cause a mark to be produced by one or more of the single party address gates 1206 and 1207. This action in turn causes two of the "AU" buses of FIG. 12B to be marked and also causes two of the "AT" buses of FIG. 12B to be marked by virute of matrix 1212. These markings are forwarded to the "AT" and "AU" buses of the busy test matrix of FIGS. 10A and 10B so that two out of five of the flip-flops of the units storage bank are triggered together with two out of five of the flip-flops of the tens storage bank. From this point, busy test is carried out as explained hereinbefore in connection with the operation of AND gates 928—944.

However, all pre-address calls have top priority so that any call which may be carried on by a called party will be immediately terminated. If a particular called party is busy, BT lead 956 is unmarked as explained hereinbefore, so that switchthrough gate 957 is disenabled. However, when a pre-address call is placed, pre-address flip-flop 914 is set to partially enable pre-address gate 995′. If a busy signal should be returned, however, busy set gate 962 will become operated thereby to operate gate 994. This action causes a mark to be forwarded through OR gate 1033 of the line busy test matrix to cause a mark to be produced on the BT lead. This mark causes switchthrough gate 957 to become fully enabled so that the effect of the busy signal is nullified and the time slot of the calling party is inserted in the time slot store of the called party. Just before this is accomplished, the time slot store of the called party is reset as explained hereinafter in connection with the operation of the priority circuitry.

It should be noted that if a single party is being called by means of the preset address arrangement, the multiple party address gate 1208 will not be enabled.

*Multiple Party Pre-Address*

In the event that the calling party actuates a pre-address key which is associated with a multiple party pre-address conference call, preset address flip-flop 914 will be triggered as mentioned hereinabove so that AND gates 981—985 steer the two-out-of-five code to the stored address circuit of FIGS. 12A and 12B. However, in this case, the two-out-of-five code will cause multiple party address gate 1208 to produce a mark in the input circuit of AND gates 1210 and 1211. Single party address gates 1206 and 1207 will remain unoperated.

This mark passes through OR gate 1221 thereby to actuate the called party address counter 1217 which counter is utilized to sequentially enable distributing gates 1218, which in turn sequentially select varoius crosspoints of the line busy test matrix, thereby to enable the line time slot stores associated with the crosspoints. The operation of flip-flop 1222 together with the marks produced on the left-hand output terminals of flip-flops 1223 and 1224 cause the operation of distributing AND gate 1226 thereby to cause two out of five of the flip-flops of the units store 1002 and two out of five of the flip-flops of the tens store 1003 to become triggered. The particular flip-flops triggered will depend on the manner in which the encoding gates 1219 are coupled to the "AT" and "AU" buses which are in turn connected to the flip-flops of the line busy test matrix. At the same time that flip-flop 1222 is triggered, a mark is produced on CRI lead 1214 because AND gate 1210 is partially enabled by virtue of inverter 1213. This mark causes AND gate 988 to become inhibited and partially enables ACG gate 991. AND gate 988 remains inhibited until the cyclical operation of the called party address counter 1217 is complete. The operation of the flip-flops of the tens store and the units store of the line busy test matrix cause a mark to be forwarded on BT lead 1052 thereby to partially enable switchthrough gate 957 of the register since ROA lead 958 is also marked at this time. The time slot produced on the TSS terminal of the register time slot store will pass through switchthrough gate 957 to delay means 997, OR gate 987, ACG gate 991, AND gate 1211 and OR gate 1221, which action causes flip-flop 1222 to become reset and to cause flip-flop 1223 to become set. As a result, distributing gate 1231 is fully enabled and distributing gate 1226 is disenabled so that a second crosspoint of the line busy test matrix is enabled which crosspoint is associated with the second called party of the multiple party pre-address. This action is repeated until all of the line time slot stores of the parties assigned to this particular multiple party pre-address have received the time slot produced on the TSS terminal of the register time slot store. The marking of the CS lead causes the flip-flops of the line busy test matrix to become reset before the operation of the succeeding distributing gate. Other flip-flops will not be reset, however, due to the inhibiting of gate 988.

It should be noted at this time that if one of the called parties associated with the multiple party address is already talking that a busy signal is not returned. The multiple party pre-address has absolute top priority at all times so that each called party in the multiple party pre-address will be discontinued from the call which he is carrying on and will be connected to the party instituting the multiple party pre-address. It is recalled that in the event that the called party associated with a particular crosspoint is busy, a mark is not produced on the BT lead 956 and switchthrough gate 957 is not enabled so that the time slot cannot be forwarded to the called party's line time slot store over the time slot pulse lead 958. This, however, is not the case when a multiple party address call has been instituted. In the event that one of the called parties is busy, no mark is produced on BT lead 956. This, however, causes busy set gate 962 to become partially enabled due to the operation of inverter 961. Because ROA lead 968 is marked at this time, a mark is produced on lead 964. The operation of preset address flip-flop 914 causes a mark to be produced on lead 999 so that a mark is produced in the output circuit of pre-address gate 995 which in turn causes a mark to be produced in the output circuit of AND gate 994. This action causes a mark to be forwarded to the busy test matrix over P lead 993. Assuming that the party associated with crosspoint "D" is busy during the multiple party pre-address, the aforementioned mark passes through OR gate 1033 and AND gate 1027 so that the mark, which would normally not be produced on the BT lead when the called party associated with crosspoint "D" is busy, is produced on the BT lead, and the switchthrough gate 957 is fully enabled thereby to transmit the time slot produced on the TTS terminal of the register time slot store to the line time slot store of the called party. While this action is taking place, the line time slot store of the called party associated with crosspoint "D" is reset so that the old time slot circulating in the line time slot store is erased. This action is carried out as follows: a mark is forwarded from crosspoint "D" of the line busy test matrix over enabling lead 1051, which is coupled to enabling lead 519 of FIG. 5. Since start flip-flop 506 is already set due to the fact that a time slot is at this time stored in the line time slot store of FIG. 5, a mark is produced in the output circuit of reset gate 521 thereby to reset the entire line time slot store so that by the time the aforementioned time slot passes through switchthrough gate 957, the line time slot store may receive the new time slot.

It should be noted that during the operation of preset address flip-flop 914, a mark is not present on junction 916 and on lead 971 of busy indication gate 972 so that the busy flip-flop cannot be triggered thereby to forward busy tone to the calling party. The called party address counter 1217 continues to be operated by the time slot continuously produced by the switchthrough gate 957 until connections have been completed in the aforementioned manner with all of the called parties. When the last distributing gate 1218 produces a mark in its output circuit thereby to select the last called party, a mark is produced in the input circuit of inverter 1213 which causes AND gate 1210 to become disenabled. This action prevents ACG gate 991 from forwarding drive pulses to the called party address counter 1217 and removes the inhibit condition from AND gate 998 thereby to set the stage for the resetting of the entire system as explained hereinbefore. During this resetting operation, a mark is produced by the register on RS lead 1242 thereby to reset the called party address counter 1217 and flip-flops 1201–1205.

*Priority Check Circuit*

In the event that a call is processed to the point where busy tone is returned to the calling party, the calling party may wish to attempt to exercise his priority. In the event that the calling party has a higher priority than the called party and the party with whom he is talking, the present invention provides means for interrupting the call being carried on by the called party and connecting him with the calling party. A priority key may be provided in order to make the exercise of priority optional on the part of the calling party or, if desired, the process could be carried out automatically. In any event, in attempting to exercise priority, a signal is transmitted by the calling party which causes a mark to be produced in the output circuit of the P detector 912 which mark causes the operation of priority flip-flop 983. This action produces a mark on the PC lead which couples priority flip-flop 983 with AND gate 1301 of the priority check circuit of FIGS. 13A and 13B. The priority check circuit resolves the question as to whether or not the calling party has a higher priority than the called party and the party with whom he is talking. If the priority of the calling party is higher than the called party and the party with whom he is talking, a mark is produced on PR lead 1302 by priority flip-flop 1303 which mark is forwarded to AND gate 994 of the allotted register through one of the AND gates 1371 and 1372. The AND gate associated with the marked ROT lead is engaged so that the priority mark on 1302 is transmitted to the allotted register.

A conventional ring counter 1304 is continually operated by clock pulses which are transmitted to the ring counter through counter drive gate 1306. When the priority mark is transmitted to AND gate 1301, for instance, and when a mark is produced in the output circuit of the first stage of ring counter 1304, the operation of the counter ceases because counter drive gate 1306 is inhibited by the mark produced in the output circuit of AND gate 1301. This mark is forwarded to the line busy test matrix over ROI lead 1308 thereby to fully enable the right-hand AND gate of the crosspoint associated with the called party who is carrying on a call with a third party. This action causes a mark to be forwarded over the CLI lead of the line busy test matrix and of the priority check circuit. One of the AND gates 1311 is partially enabled by the marking of its associated CLI lead. This particular AND gate has an input lead which is coupled to the TTS bus of the line time slot store of the called party so that the time slot contained in this line time slot store will be produced on lead 1313 which communicates with each and every one of AND gates 1314. Each one of these AND gates has another input lead which is coupled to the BF lead of an associated line time slot store. If the called party has been assigned the highest priority, AND gate 1316 will be enabled so that flip-flop 1317 is actuated. If the called party has been assigned a priority rating of the second order, flip-flop 1318 will be operated, etc. It should be apparent that the operation of flip-flop 1320 indicates that the called party has been assigned a priority rating of the lowest order. It should also be apparent that only one AND gate of gates 1314 will be fully enabled during the priority check operation since the same time slot will be produced simultaneously on both input leads of only one AND gate. Each BF lead, disclosed in the right-hand portion of FIG. 13B, is coupled to the BF lead of an associated line time slot store so that only the time slot circulating in the associated time slot store will be produced on the BF lead.

The aforementioned mark produced by AND gate 1301 is also transmitted over ROT lead 1331 thereby to partially enable AND gate 995 of the register which in turn causes the time slot circulating in the register time slot store to be forwarded to PTS lead 1333 via PTS lead 996. Accordingly, the time slot which has been assigned to the calling party is produced on PTS lead 1333. Each of the BF leads disclosed in the right-hand portion of priority check circuit of FIG. 13B is coupled to an associated AND gate of the group of AND gates 1336. If the calling party has been assigned the highest priority, the time slot which has been assigned to the calling party will be produced in the output circuit of AND gate 1337. In like manner, if he has been assigned the lowest level of priority, the time slot which has been assigned to the calling party will be produced in the output circuit of either AND gate 1361, 1362, 1363, or 1364. AND gates 1338 and 1339 are connected to line circuits which have been assigned a second level of priority over their associated BF leads. Priority rating gates 1366 are connected to resolve the question as to whether or not the calling party has been assigned a priority rating which is higher than the called party and the party with whom he is talking. For example, let it be assumed that the called party has the lowest priority thereby to cause flip-flop 1320 to become actuated. The remaining flip-flops will not become actuated so that all of the priority rating gates are partially enabled except gate 1371. The other priority rating gates will all be enabled because the unactuated flip-flops will produce marks in their output circuits. One of the AND gates 1336 will become fully enabled in the same manner as one of the AND gates 1314 were enabled, as discussed hereinbefore. In the event that the calling party should have a priority rating of the lowest order, AND gate 1361, 1362, 1363, or 1364 will become enabled thereby to produce a mark in one of the input leads of AND gate 1371. Due to the operation of flip-flop 1320, this mark will not be transmitted through priority rating gate 1371 and as a result priority flip-flop 1303 will not operate. It should be noted that if the calling party has been assigned a priority rating higher than the lowest order, a mark will be forwarded by the particular gate of the group of AND gates 1336 to one of the enabled priority rating gates 1366 other than the disenabled priority rating gate 1371 and, as a result, priority flip-flop 1303 will become operated.

Let us assume, however, that the called party has been assigned the highest priority rating, flip-flop 1317 will become operated thereby to disenable all of the priority rating gates so that the priority flip-flop 1303 cannot be operated regardless of the priority rating of the calling party. However, if the calling party has the highest priority rating and if the called party has a lower priority rating, priority rating gate 1372 will be enabled because flip-flop 1317 will not be operated. Accordingly, AND gate 1337 which is associated with the highest level of priority will forward a mark to AND gate 1372 which mark will cause priority flip-flop 1303 to become operated. It should be obvious that the calling party's priority must be higher than the called party's priority in order to operate priority flip-flop 1303. If they are of the same priority, priority flip-flop 1303 will not become operated.

Besides comparing the priority rating of the calling party with the called party, comparison is also carried out by the logic circuit of FIGS. 13A and 13B between the priority rating of the calling party and the priority rating of the party to whom the called party is talking. If the priority ratings of the parties carrying on the call are different, it follows that two of the flip-flops 1317—1320 will become set, but only the one associated with the higher priority level will control the decision of the logic circuit of FIG. 13B.

If the priority rating of the calling party is superior to the priority rating of the called party and the party with whom he is talking, flip-flop 1303 will become operated thereby to cause a mark to be forwarded over PR lead 1302 and over the PR lead of the allotted register to cause a mark to be produced in turn in the output circuit of AND gate 994. As explained hereinbefore in connection with the operation of the pre-address circuitry, the mark produced by AND gate 994 causes the line time slot store of the called party to become reset and set according to the time slot assigned to the new calling party.

The aforementioned operation of the priority flip-flop 983 causes the removal of a mark which is normally produced on lead 984 when the priority flip-flop is in the reset condition. This action prevents the busy tone generator from transmitting busy tone to busy gate 979 via AND gate 981 and in addition causes AND gate 981' to become enabled due to the operation of inverter 984'. As a result, a priority check tone is transmitted through the busy gate 979 and is heard by the calling party. This indicates that a priority check is being carried out. If the calling party has a higher priority than the called party, busy flip-flop 976 will become reset by the mark transmitted over the PR lead. This action causes the busy flip-flop 976 to become reset thereby to disenable busy tone gate 978 which in turn prevents the transmission of busy tone over the common transmission highway to the calling party. In the event that the priority of the calling party is insufficient to interrupt the call carried on by the called party, a mark is not produced on the PR lead of the register so that busy flip-flop 976, which has been already set due to the busy condition returned by the called party, is not reset so that busy tone gate 978 remains partially enabled. The time slot produced on the TTS terminal of the register time slot store enables busy gate 979 thereby to transmit busy tone back to the calling party. At this time, AND gate 981' has been disenabled due to the fact that monostable multivibrator 930' has returned to its initial condition. This action reenables AND gate 981.

When priority flip flop 983 is returned to its reset condition, the mark is removed from the PC lead coupled to the input circuit of AND gate 1301 so that counter drive gate 1306 is no longer inhibited and, accordingly, ring counter 1304 recommences its scanning operation.

While there has been disclosed what is at present considered to be the preferred embodiment of the invention, other modifications will readily occur to those skilled in the art. It is not, therefore, desired that the invention be limited to the specific arrangement shown and described and it is intended in the appended claims to cover all such modifications as fall within the true spirit and scope of the invention.

What is claimed is:

1. In a time division multiplex telephone system, a plurality of line circuits each having an associated pulse store, a plurality of registers each having a register pulse store, means for assigning a particular register to a particular call, means for producing a pulse within a particular time slot and inserting it into the pulse store of a line circuit associated with a calling party and into the pulse store of an assigned register, means for coupling a first signaling lead situated within said line circuit to a second signaling lead situated within said assigned register, and means responsive to the simultaneous receipt of pulses from the pulse store situated within an assigned register and the pulse store associated with the line circuit of a calling party for actuating said means for coupling, thereby to complete a signaling path between the line circuit associated with a calling party and an assigned register.

2. In a time division multiplex telephone system, a plurality of line circuits each having an associated pulse store, a plurality of registers each containing a register pulse store, means for producing a pulse within a particular time slot and inserting it into the pulse stor associated with the line circuit of a calling party and into the time slot store of an assigned register, a matrix having a plurality of vertical and horizontal leads, means for coupling the first vertical lead to the output circuit of the pulse store associated with a first line circuit, means for coupling the Mth vertical lead to the output circuit of the pulse store associated with an Mth line circuit, means for coupling the first horizontal lead to the output circuit of the pulse store of the first register, and means for coupling the Nth horizontal lead to the output circuit of the pulse store of the Nth register so that a particular crosspoint of said matrix is enabled to complete a signaling path from the line circuit of a calling party to an assigned register.

3. In a time division multiplex telephone system, a plurality of line circuits each having an associated pulse store and each having a signaling circuit, a plurality of registers each containing a pulse store and each containing a signaling circuit, means for producing a pulse within a particular time slot and inserting it into pulse store associated with the line circuit of a calling party and into the pulse store of an assigned register, a matrix having a first set of vertical leads each of which is coupled to the output circuit of an associated line pulse store, said matrix also having a second set of vertical leads each of which is coupled to the output circuit of an associated signaling circuit, said matrix having a first set of horizontal leads each of which is coupled to the output circuit of an associated register pulse store, said matrix also having a second set of horizontal leads each of which is coupled to the input circuit of an associated register signaling circuit, means associated with each of the intersections of the second sets of horizontal and vertical leads capable of coupling said second sets of leads together, and means associated with each of the intersections of the leads of said first set for activating its associated coupling means when a signal is produced simultaneously on the intersecting leads of the first set so that a signaling path may be completed between the line circuit associated with the calling party and the register which has been assigned to the call.

4. In a time division multiplex telephone system, means for coupling a first line associated with a calling party to a common transmission channel during sub-intervals or time slots within recurring intervals or transmission frames, means for transmitting directive information, means responsive to the operation of said means for transmitting for selecting and testing a second line associated with a called party to determine whether or not said second line is in use, means responsive to the operation of said means for selecting and testing for causing a busy signal to be produced on said common transmission channel during said sub-interval or time slot within recurring intervals or transmission frames when said second line is in use, means capable of transmitting a pre-address signal along with said directive information, means responsive to the transmission of said pre-address signal for inhibiting the operation of said means for causing a busy signal to be produced on said common transmission channel when said second line is in use.

5. In a time division multiplex telephone switching system, means for coupling a first line associated with a calling party to a common transmission channel during sub-intervals or time slots within recurring intervals or transmission frames, means for transmitting directive information, means responsive to the operation of said means for transmitting for selecting and testing a second line associated with a called party to determine whether or not said second line is in use, means responsive to the operation of said means for selecting and testing for causing a busy signal to be produced on said common transmission channel when said second line is in use, means for transmitting a priority check signal with said directive information, means responsive to the transmission of said priority check signal for determining whether or not the priority rating assigned to said first line has a higher rating than the priority rating assigned to said second line, and means responsive to the operation of said means for determining for inhibiting the operation of said means for causing a busy signal to be produced on said common transmission channel if said first line has a higher priority rating than said second line.

6. In a telephone system, first means for completing a signaling path between a first line circuit associated with a calling party and a second line circuit associated with a called party when said second line circuit is not in use, second means for preventing the completion of said signaling path between said first and second line circuit where said second line circuit is in use, third means for initiating a priority check in the event that said second line circuit is in use, means for assigning a priority rating to each line circuit, fourth means responsive to the operation of said third means for determining whether or not said first line circuit has a higher priority rating than said second line circuit, and means responsive to the operation of said fourth means for rendering said second means inoperative where said first line circuit has a higher priority rating than said second line circuit.

7. In a telephone system, first means for completing a signal path between a first line circuit associated with a calling party and a second line circuit associated with a called party when said second line circuit is not in use, second means for preventing the completion of said signaling path between said first and second line circuit when said second line circuit is in use, means for assigning a priority rating to the line circuits of the system, third means for initiating a priority check in the event that said second line circuit is in use, fourth means for deactivating said second means, a plurality of signal sources each coupled through an associated gate to said fourth means, fifth means responsive to the operation of said third means for causing one of said output sources to produce an output signal depending upon the priority rating of said first line circuit and means for enabling one or more of said gates depending upon the priority rating of said second line circuit thereby to operate said fourth means in the event that the priority rating of said first line circuit is superior to the priority rating of said second line circuit.

8. In a telephone system, first means for completing a signaling path between a first line circuit associated with a calling party and a second line circuit associated with a called party when said second line circuit is not in use, second means for preventing the completion of said signaling path between said first and second line circuit where said second line circuit is in communication with a third line circuit, third means for initiating a priority check in the event that said second line circuit is in use, means for assigning a priority rating to each line circuit, fourth means responsive to the operation of said third means for determining whether or not said first line circuit has a higher priority rating than both said second line circuit and said third line circuit, and means responsive to the operation of said fourth means for rendering said second means inoperative where said first line circuit has a higher priority rating than both said second line circuit and said third line circuit.

9. In a telephone system, first means for completing a signal path between a first line circuit associated with a calling party and a second line circuit associated with a called party when said second line circuit is not in use, second means for preventing the completion of said signaling path between said first and second line circuit when said second line circuit is in communication with a third line circuit, means for assigning a priority rating to the line circuits of the system, third means for initiating a priority check in the event that said second line circuit is in communication with a third line circuit, fourth means for deactivating said second means, a plurality of signal sources each coupled through an associated gate to said fourth means, fifth means responsive to the operation of said third means for causing one of said output sources to produce an output signal depending upon the priority rating of said first line circuit, and means for enabling one or more of said gates depending upon the priority rating of said second line circuit and said third line circuit thereby to operate said fourth means in the event that the priority rating of said first line circuit is superior to the priority rating of both said second and third line circuits.

References Cited in the file of this patent

UNITED STATES PATENTS

| | | |
|---|---|---|
| 1,492,995 | Lubberger | May 6, 1924 |
| 1,960,037 | Williams et al. | May 22, 1939 |
| 2,513,964 | Pearce et al. | July 4, 1950 |
| 2,883,472 | Stehlik | Apr. 21, 1959 |